United States Patent
Kim et al.

(10) Patent No.: US 10,631,342 B2
(45) Date of Patent: Apr. 21, 2020

(54) METHOD FOR TRANSMITTING AND RECEIVING RANDOM ACCESS PREAMBLE IN WIRELESS COMMUNICATION SYSTEM AND DEVICE THEREFOR

(71) Applicant: LG Electronics Inc., Seoul (KR)

(72) Inventors: Jaehyung Kim, Seoul (KR); Changhwan Park, Seoul (KR); Seokmin Shin, Seoul (KR); Joonkui Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/409,436

(22) Filed: May 10, 2019

(65) Prior Publication Data

US 2019/0380151 A1 Dec. 12, 2019

Related U.S. Application Data

(60) Provisional application No. 62/669,979, filed on May 10, 2018.

(51) Int. Cl.
*H04W 74/08* (2009.01)

(52) U.S. Cl.
CPC .............. *H04W 74/0833* (2013.01)

(58) Field of Classification Search
CPC .................................. H04W 74/0833
See application file for complete search history.

(56) References Cited

U.S. PATENT DOCUMENTS

| | | | |
|---|---|---|---|
| 2017/0265230 A1* | 9/2017 | Liu ................. | H04W 74/08 |
| 2017/0339712 A1* | 11/2017 | Rico Alvarino .. | H04W 72/1268 |
| 2019/0223224 A1* | 7/2019 | Park ................. | H04W 74/0833 |

FOREIGN PATENT DOCUMENTS

| | | |
|---|---|---|
| KR | 20170137051 | 12/2017 |
| KR | 20180041706 | 4/2018 |

OTHER PUBLICATIONS

Wi rapporteur (Ericsson), "RAN1 agreements for Rel-13 NB-IoT," R1-165977, 3GPP TSG-RAN WG1 Meeting #85, Nanjing, China, dated May 22-26, 2016, 33 pages.

Huawei, HiSilicon, "NPRACH enhancement for cell radius extension," R1-1803879, 3GPP TSG RAN WG1 Meeting #92bis, Sanya, China, dated Apr. 16-20, 2018, 8 pages.

LG Electronics, "Resource configuration for NPRACH range enhancement," R1-1804527, 3GPP TSG RAN WG1 Meeting #92bis, Sanya, China, dated Apr. 16-20, 2018, 6 pages.

* cited by examiner

*Primary Examiner* — Ronald B Abelson
(74) *Attorney, Agent, or Firm* — Fish & Richardson P.C.

(57) ABSTRACT

Provided is a method for transmitting a random access preamble by a user equipment (UE) in a wireless communication system supporting a narrow band-Internet of things (NB-IoT). Specifically, the UE transmits the random access preamble to an eNB in a subcarrier allocated by the eNB according to a specific preamble structure and receives a random access response message from the eNB in response to the random access preamble. In this case, the random access preamble is repeatedly transmitted 16 times during a predetermined duration and then, a gap is inserted for a predetermined time and the predetermined duration is determined by multiplying a transmission duration in which the random access preamble is transmitted by the number of repeated transmission times.

17 Claims, 15 Drawing Sheets

METHOD FOR TRANSMITTING AND RECEIVING RANDOM ACCESS PREAMBLE IN WIRELESS COMMUNICATION SYSTEM AND DEVICE THEREFOR

CROSS-REFERENCE TO RELATED APPLICATIONS

This application claims priority to U.S. Provisional Application No. 62/669,979, filed on May 10, 2018, the entire contents of which are hereby incorporated by reference in its entirety.

BACKGROUND OF THE INVENTION

Field of the Invention

The present invention relates to a method for transmitting and receiving a random access preamble in a wireless communication system, and more particularly, to a method for transmitting and receiving a random access preamble in a wireless communication system supporting NarrowBand-Internet of Things (NB-IoT) and a device for supporting the same.

Related Art

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wideband, and device networking, have been researched.

SUMMARY OF THE INVENTION

The present invention provides a method for transmitting and receiving a random access preamble in a wireless communication system supporting NarrowBand-Internet of Things (NB-IoT).

The present invention also provides a structure of a physical random access channel (PRACH) for cell range extension.

The present invention also provides a method for preventing performance deterioration and synchronization deviation which may occur due to repetitive transmission of a random access preamble.

The technical objects of the present invention are not limited to the aforementioned technical objects, and other technical objects, which are not mentioned above, will be apparently appreciated by a person having ordinary skill in the art from the following description.

In an aspect, provided is a method for transmitting a random access preamble by a user equipment (UE) in a wireless communication system supporting a narrow band-Internet of things (NB-IoT), which includes: transmitting, to a base station, a random access preamble according to a specific preamble structure in a subcarrier allocated by the base station; and receiving, from the base station, a random access response message in response to the random access preamble, in which a gap is inserted for a predetermined time after the random access preamble is repeatedly transmitted 16 times during a predetermined duration, and the predetermined duration is determined by multiplying a transmission duration transmitted by the random access preamble by the number of repeated transmission times of the random access preamble.

Furthermore, in the present invention, the transmission duration is constituted by a symbol group of a Cyclic Prefix (CP) and three symbols according to the specific preamble structure.

Furthermore, in the present invention, a subcarrier of the symbol group is hopped on a frequency axis in a specific pattern constituted by a hopping pair symmetric according to the specific preamble structure.

Furthermore, in the present invention, subcarrier indexes of second and third symbol groups are values larger than a subcarrier index of a previous symbol group by '1' or smaller than the subcarrier index by '1' based on a start symbol group of the specific pattern, subcarrier indexes of the third symbol group and a fourth symbol group are values larger than the subcarrier index by '3' or smaller than the subcarrier index '3', and a subcarrier index of a fifth symbol group is a value larger than the subcarrier index of the previous symbol group by '18'.

Furthermore, in the present invention, a subcarrier spacing is 1.25 kHz in the specific preamble structure.

Furthermore, in the present invention, the gap is '40' ms.

Furthermore, in the present invention, the random access response message includes a timing advance command value for adjusting uplink transmission timing of the UE.

Furthermore, in the present invention, the method further includes performing uplink transmission based on the timing advance command value.

Furthermore, in the present invention, provided is a method for receiving a random access preamble by a base station in a wireless communication system supporting a narrow band-Internet of things (NB-IoT), which includes: receiving, from a UE, a random access preamble according to a specific preamble structure in an allocated subcarrier; and transmitting, to the UE, a random access response message in response to the random access preamble, in which wherein a gap is inserted for a predetermined time after the random access preamble is repeatedly transmitted 16 times during a predetermined duration, and the predetermined duration is determined by multiplying a transmission duration transmitted by the random access preamble by the number of repeated transmission times of the random access preamble.

Furthermore, in the present invention, provided is a UE transmitting a random access preamble in a wireless communication system supporting a narrow band-Internet of things (NB-IoT), which includes: a radio frequency (RF) module for transmitting and receiving a radio signal; and a processor functionally connected with the RF module, in which the processor is configured to transmit, to a base station, a random access preamble according to a specific preamble structure in a subcarrier allocated by the base station, and receive, from the base station, a random access response message in response to the random access preamble, and a gap is inserted for a predetermined time after the random access preamble is repeatedly transmitted 16 times during a predetermined duration, and the predetermined duration is determined by multiplying a transmission duration transmitted by the random access preamble by the number of repeated transmission times of the random access preamble.

This specification has an effect that a cell range may be extended by transmitting a random access preamble through a structure of a new physical random access channel (PRACH).

This specification also has an effect that performance deterioration and synchronization deviation may be prevented by transmitting repeatedly transmitting a random access preamble a specific number of times at the time of repeatedly transmitting the random access preamble and then, inserting a gap for stopping transmission for a predetermined time.

Advantages which can be obtained in the present invention are not limited to the aforementioned effects and other unmentioned advantages will be clearly understood by those skilled in the art from the following description.

BRIEF DESCRIPTION OF THE DRAWINGS

In order to help understanding of the present invention, the accompanying drawings which are included as a part of the Detailed Description provide embodiments of the present invention and describe the technical features of the present invention together with the Detailed Description.

DESCRIPTION OF EXEMPLARY EMBODIMENTS

Figure 1:
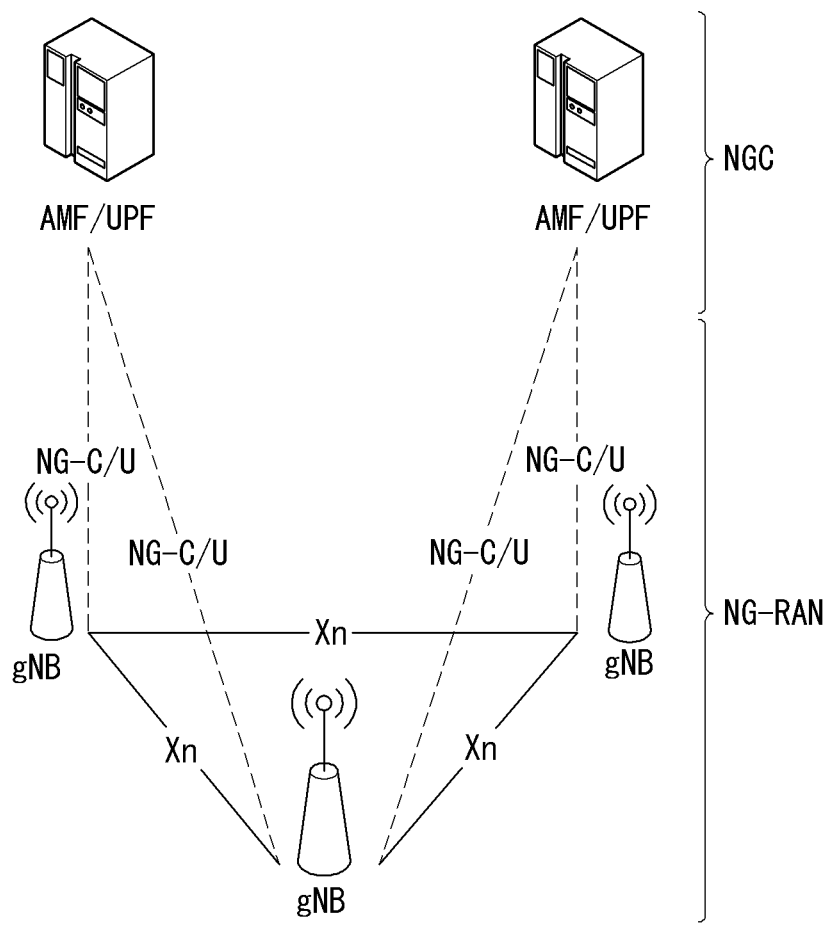
FIG. 1 is a diagram illustrating an example of an overall system structure of NR to which a method proposed in the present specification may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP) gNB (next generation NB, general NB, gNodeB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (Wi-MAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Further, 5G new radio (NR) defines Enhanced Mobile Broadband (eMBB), Massive Machine Type Communications (mMTC), Ultra-Reliable and Low Latency Communications (URLLC), and vehicle-to-everything (V2X) according to a usage scenario.

In addition, the 5G NR standard is divided into standalone (SA) and non-standalone (NSA) depending on co-existence between the NR system and the LTE system.

In addition, the 5G NR supports various subcarrier spacings, and supports CP-OFDM in the downlink and CF-OFDM and DFT-s-OFDM (SC-OFDM) in the uplink.

Three major requirement areas of 5G include (1) an Enhanced Mobile Broadband (eMBB) area, (2) a Massive Machine Type Communication (mMTC) area, and (3) an Ultra-reliable and Low Latency Communications (URLLC) area.

Some use cases may require multiple areas for optimization and other use cases may only focus on only one key performance indicator (KPI). 5G is to support the various use cases in a flexible and reliable method.

eMBB far surpasses basic mobile Internet access and covers media and entertainment applications in rich interactive work, cloud or augmented reality. Data is one of the key drivers of 5G and may not be able to see dedicated voice services for the first time in the 5G era. In 5G; the voice is expected to be processed as an application program simply by using data connection provided by a communication system. Main reasons for an increased traffic volume are an increase in content size and an increase in number of applications requiring a high data rate. A streaming service (audio and video), an interactive video, and mobile Internet connection will be more widely used as more devices are connected to the Internet. A lot of application programs require always-on connectivity in order to push real-time information and notification to a user. Cloud storages and applications are growing rapidly in mobile communication platforms, which may be applied to both work and entertainment. In addition, the cloud storage is a special use case of drives a growth of an uplink data transmission rate. 5G is also used in remote work of the cloud and requires a lower end-to-end latency so as to maintain an excellent user experience when a tactile interface is used. The entertainment, for example, a cloud game and video streaming are another key factor for increasing a demand for a mobile broadband capability. The entertainment is required in a smart phone and a tablet anywhere including a high mobility environment such as a train, a vehicle, and an airplane. Another use case is augmented reality and information retrieval for the entertainment. Here, the augmented reality requires a very low latency and an instantaneous data amount.

Further, one of 5G use cases most expected relates to a function to smoothly connect an embedded sensor in all fields, that is, mMTC. By 2020, the number of potential IoT devices is expected to reach 20.4 billion. Industry IoT is one of the areas where 5G plays a key role in enabling smart cities, asset tracking, smart utilities, agriculture, and security infrastructures.

URLLC includes new services that will change the industry through ultra reliable/usable links with low latency such as remote control of key infrastructure and self-driving vehicles. Levels of reliability and latency are required for smart grid control, industrial automation, robotics, and drone control and adjustment.

Next, multiple use cases will be described in more detail.

5G may complement fiber-to-the-home (FTTH) and cable-based broadband (or DOCSIS) as a means of providing streams rated at gigabits per second at hundreds of megabits per second. Such a fast speed is required to deliver TVs with resolutions of 4K and above (6K, 8K, and above) as well as virtual reality and the augmented reality. The Virtual Reality (VR) and Augmented Reality (AR) applications include mostly immersive sports games. A specific application program may require a special network configuration. For example, in the case of a VR game, game companies may need to integrate a core server with an edge network server of a network operator in order to minimize latency.

Automotive is expected to become an important new power for 5G with many use cases for mobile communications to vehicles. For example, entertainment for passengers demands simultaneous high capacity and high mobility mobile broadband. The reason is that future users will continue to expect high-quality connections regardless of locations and speeds thereof. Another utilization examples of an automotive field is an augmented-reality dashboard. This identifies an object in the dark over what a driver is seeing through a front window, and overlaps and displays information that tells the driver regarding a distance and a motion of the object. In the future, a wireless module enables communication between vehicles, information exchange between the vehicle and a supported infrastructure, and information exchange between the vehicle and other connected devices (e.g., devices carried by a pedestrian). A safety system guides an alternative course of an action in order for the driver to drive safer driving, thereby reducing the risk of accidents. A next step will be a remotely controlled or self-driven vehicle. This requires very reliable and very fast communication between different self-driving vehicles and between the automatic and the infrastructure. In the future, the self-driven vehicle will perform all driving activities and the driver will focus only on traffic which the vehicle itself may not identify. Technical requirements of the self-driven vehicle require ultra-low latency and ultra-high-speed reliability so as to increase a traffic safety to a level not achievable by humans.

Smart cities and smart homes, referred to as smart societies, will be embedded into high-density wireless sensor networks. A distributed network of intelligent sensors will identify conditions for cost and energy-efficient maintenance of a city or house. A similar configuration may be performed for each home. Temperature sensors, windows and heating controllers, burglar alarms, and appliances are all wirelessly connected. Many of the sensors typically have low data rate, low power, and low cost. However, for example, real-time HD video may be required for specific types of devices for monitoring.

Consumption and distribution of energy including heat or gas is highly dispersed, requiring automated control of distributed sensor networks. A smart grid interconnects the sensors using digital information and communication technologies to collect information and act based on the information. The information may include vendor and consumer behaviors, allowing the smart grid to improve the distribution of fuels, such as electricity, in an efficiency, reliability, economics, and sustainability of production and in an automated way. The smart grid may be regarded as another sensor network with low latency.

A health sector has many application programs that may benefit from mobile communications. Communication systems may support telemedicine to provide clinical care in remote locations. This may help to reduce barriers to a distance and improve an access to health services that are not continuously available in distant rural areas. This is also used to save lives in critical care and emergency situations. Wireless communication based wireless sensor networks may provide remote monitoring and sensors for parameters such as heart rate and blood pressure.

Wireless and mobile communications are becoming increasingly important in industrial application fields. Wires are high in installation and maintenance cost. Thus, a possibility of replacing cables with reconfigurable wireless links is an attractive opportunity in many industries. However, achieving this requires that wireless connections operate with similar delay, reliability, and capacity as cables, and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/NR (New RAT) is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

Numerology: Corresponds to one subcarrier spacing in a frequency domain. Different numerology may be defined by scaling reference subcarrier spacing to an integer N.

NR: NR Radio Access or New Radio

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or $\mu$). In addition, although a very low subcarrier spacing is assumed not to be used at a very high subcarrier frequency, a numerology to be used may be selected regardless of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max}=N_f/1000) \cdot T_s=1$ ms. In this case, there may be a set of UL frames and a set of DL frames.

Figure 2:
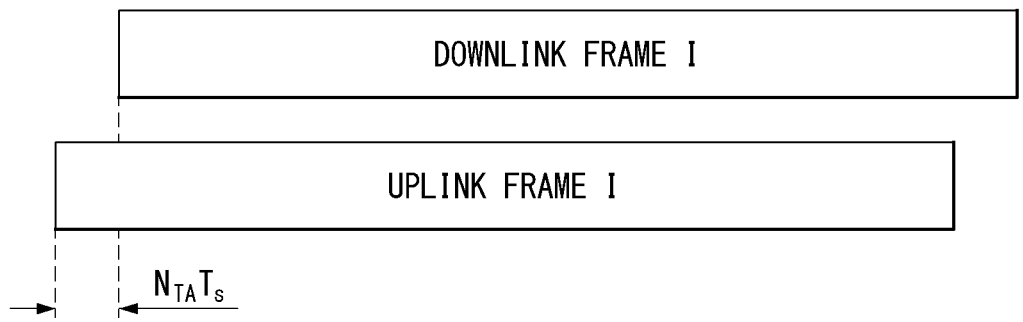
FIG. 2 illustrates a relationship between an uplink frame and a downlink frame in a wireless communication system to which the method proposed in the present specification may be applied.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology $\mu$, slots are numbered in ascending order of $n_s^\mu \in \{0, \ldots, N_{subframe}^{slots, \mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology $\mu$, and Table 3 shows the number of OFDM symbols per slot for an extended CP in the numerology $\mu$.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
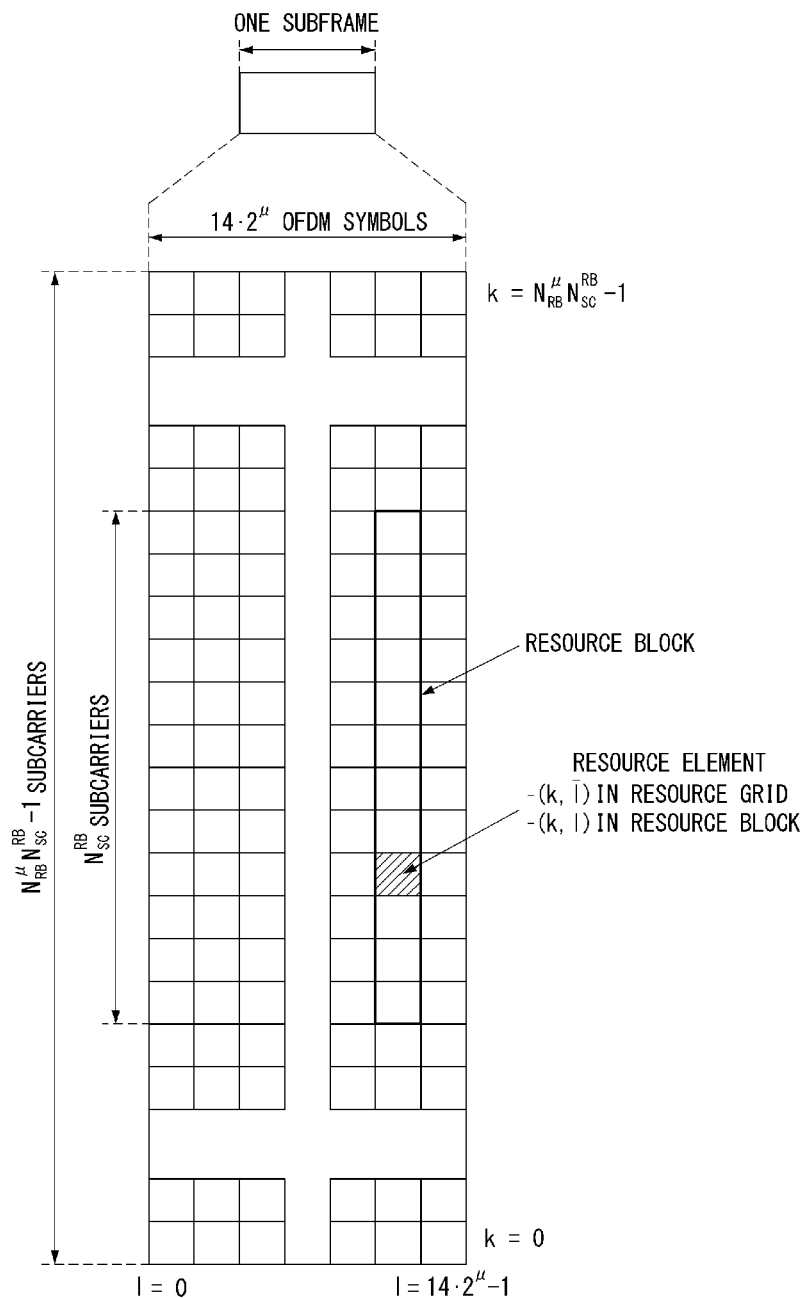
FIG. 3 illustrates an example of a resource grid supported in the wireless communication system to which the method proposed in the present specification may be applied.

FIG. 3 shows an example of a resource grid supported in a wireless communication system to which a method proposed in this specification may be applied.

FIG. 3 illustrates an example in which a resource grid includes $N_{RB}^\mu N_{sc}^{RB}$ subcarriers on the frequency domain and one subframe includes $14 \cdot 2\mu$ OFDM symbols, but the present invention is not limited thereto.

In the NR system, a transmitted signal is described by one or more resource grids including $N_{RB}^\mu N_{sc}^{RB}$ subcarriers and $2^\mu N_{symb}^{(\mu)}$ OFDM symbols. In this case, $N_{RB}^\mu \leq N_{RB}^{max, \mu}$. The $N_{RB}^{max,\mu}$ indicates a maximum transmission bandwidth, which may be different between numerologies and between uplink and downlink.

Figure 4:
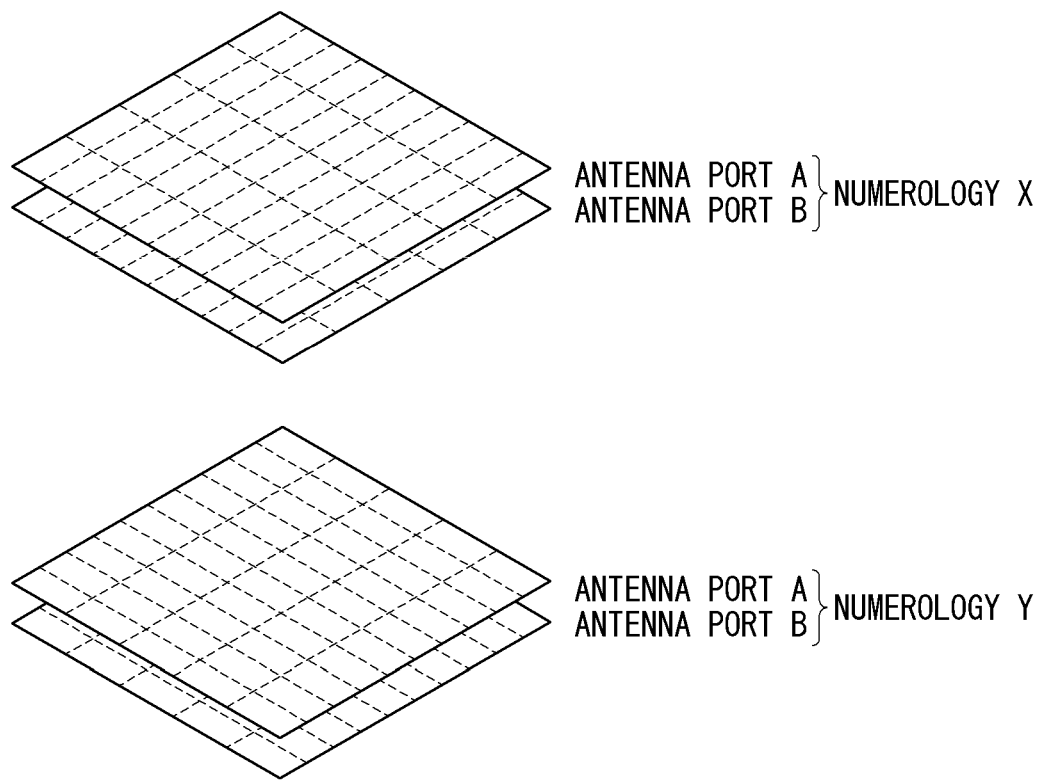
FIG. 4 shows examples of antenna ports and resource grids for each numerology to which a method proposed in this specification may be applied.

In this case, as in FIG. 4, one resource grid may be configured for each numerology $\mu$ and antenna port p.

FIG. 4 shows examples of antenna ports and resource grids for each numerology to which a method proposed in this specification may be applied.

TABLE 2

| | Slot configuration | | | | | |
|---|---|---|---|---|---|---|
| | 0 | | | 1 | | |
| $\mu$ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

Each element of the resource grid for the numerology $\mu$ and the antenna port p is indicated as a resource element, and may be uniquely identified by an index pair (k,l). Herein, $k=0, \ldots, N_{RB}^\mu N_{sc}^{RB}-1$ is an index in the frequency domain, and $\bar{l}=0, \ldots 2^\mu N_{symb}^{(\mu)}-1$ indicates a location of a symbol in a subframe. To indicate a resource element in a slot, the index pair (k,l) is used. Herein, $l=0, \ldots, N_{symb}^\mu-1$.

The resource element (k,l) for the numerology $\mu$ and the antenna port p corresponds to a complex value $a_{k,l}^{(p,\mu)}$. When there is no risk of confusion or when a specific antenna port or numerology is specified, the indexes p and $\mu$ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Slot Structure

Figure 5:
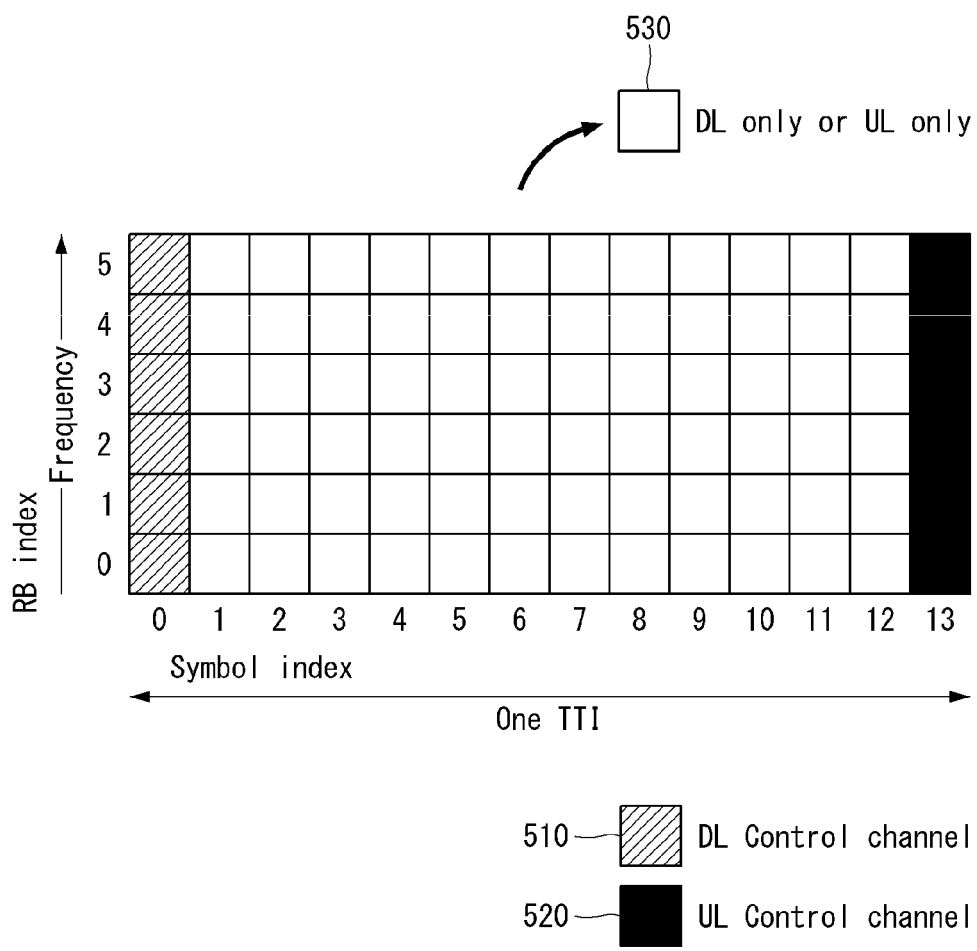
FIG. 5 is a diagram showing an example of a self-contained slot structure to which a method proposed in this specification may be applied.

In order to minimize latency of data transmission in the TDD system, a self-contained slot structure, such as FIG. 5, is taken into consideration in a 5-generation New RAT (NR).

That is, FIG. 5 is a diagram showing an example of a self-contained slot structure to which a method proposed in this specification may be applied.

In FIG. 5, a slashed region 510 indicates a downlink control region, and a black part 520 indicates an uplink control region.

A part 530 having no indication may be used for downlink data transmission and may be used for uplink data transmission.

The characteristics of such a structure is that DL transmission and UL transmission are sequentially performed within one slot and DL data is transmitted and UL Ack/Nack may also be transmitted and received within one slot.

Such a slot may be defined as a "self-contained slot."

That is, through such a slot structure, a base station can reduce the time taken for data retransmission to a UE when a data transmission error occurs, thereby being capable of minimizing latency of the final data delivery.

In such a self-contained slot structure, a base station and a UE require a time gap for a process from a transmission mode to a reception mode or a process from the reception mode to the transmission mode.

To this end, in the corresponding slot structure, some OFDM symbols at an instance from DL to UL is configured as a guard period (GP).

Latency for Infrequent Small Packets

For infrequent application layer small packet/message transfer, the time it takes to successfully deliver an application layer packet/message from the radio protocol layer 2/3 SDU ingress point at the mobile device to the radio protocol layer 2/3 SDU egress point in the RAN, when the mobile device starts from its most "battery efficient" state.

For the definition above, the latency shall be no worse than 10 seconds on the uplink for a 20 byte application packet (with uncompressed IP header corresponding to 105 bytes physical layer) measured at the maximum coupling loss (MaxCL) of 164 dB.

Analytical evaluation is the baseline evaluation methodology and system level evaluation can be considered if needed.

Coverage

MaxCL in uplink and downlink between device and Base Station site (antenna connector(s)) for a data rate of 160 bps, where the data rate is observed at the egress/ingress point of the radio protocol stack in uplink and downlink.

The target for coverage should be 164 dB and link budget and/or link level analysis are used as the evaluation methodology.

Extreme Coverage

The coupling loss is defined as the total long-term channel loss over the link between the UE antenna ports and the eNode B antenna ports, and includes in practice antenna gains, path loss, shadowing, body loss, etc.

The MaxCL is the limit value of the coupling loss at which the service can be delivered, and therefore defines the coverage of the service and the MaxCL is independent of the carrier frequency. In this case, the MaxCL is defined in the UL and DL in Equation 2 below:

UL MaxCL=UL Max Tx power−eNB Sensitivity

DL MaxCL=DL Max Tx power−UE Sensitivity  [Equation 2]

The MaxCL is evaluated via link budget analysis (supported by link level simulations) and the proposed MaxCL calculation template is given in Table 4 below.

TABLE 4

| Item | Value |
|---|---|
| Transmitter | |
| (1) Tx power (dBm) | |
| Receiver | |
| (2) Thermal noise density (dBm/Hz) | |
| (3) Receiver noise figure (dB) | |
| (4) Interference margin (dB) | |
| (5) Occupied channel bandwidth (Hz) | |
| (6) Effective noise power = | |
| (2) + (3) + (4) + 10 log(5) (dBm) | |
| (7) Required SINR (dB) | |
| (8) Receiver sensitivity = | |
| (6) + (7) (dBm) | |
| (9) MaxCL = | |
| (1) − (8) (dB) | |

In this case, an assumption shown in Table 5 below may be used.

TABLE 5

| | |
|---|---|
| UE Tx power | 23 dBm |
| DL Tx power | 46 dBm |
| eNB receiver noise figure | 5 dB |
| UE receiver noise figure | 9 dB |
| Interference margin | 0 dB |

For a basic MBB service characterized by a downlink data rate of 2 Mbps and an uplink data rate of 60 kbps for stationary users, the target on maximum coupling loss is 140 dB and for mobile users a downlink data rate of 384 kbps is acceptable.

For a basic MBB service characterized by a downlink data rate of 1 Mbps and an uplink data rate of 30 kbps for stationary users, the target on maximum coupling loss is 143 dB. At this coupling loss relevant downlink and uplink control channels should also perform adequately.

As the evaluation methodology, link budget and/or link level analysis are used for extreme long distance coverage in low density areas.

UE Battery Life

UE battery life can be evaluated by the battery life of the UE without recharge. For mMTC, UE battery life in extreme coverage shall be based on the activity of mobile originated data transfer consisting of 200 bytes UL per day followed by 20 bytes DL from MaxCL of 164 dB, assuming a stored energy capacity of 5 Wh.

The target for UE battery life for mMTC should be beyond 10 years, 15 years is desirable.

Analytical evaluation is used as the evaluation methodology.

Connection Density

Connection density refers to total number of devices fulfilling a target QoS per unit area (per km2). The target QoS is to ensure a system packet drop rate less than 1% under given packet arrival rate 1 and packet size S. Packet drop rate=(Number of packet in outage)/(number of generated packets), where a packet is in outage if this packet failed to be successfully received by destination receiver beyond packet dropping timer.

The target for connection density should be 1000000 device/km² in an urban environment.

3GPP should develop standards with means of high connection efficiency (measured as supported number of devices per TRxP per unit frequency resource) to achieve the desired connection density and analytical, link level evaluation and system level evaluation are to be performed for Urban coverage for massive connection (urban environment).

LTE PRACH

Table 6 below illustrates an example of a PRACH format supported in LTE.

TABLE 6

| Preamble format | CP duration (us) | GT duration (us) | Max. delay spread (us) | Max. cell radius (km) |
|---|---|---|---|---|
| 0 | 103.1 | 96.88 | 6.3 | 14.5 |
| 1 | 684.4 | 515.6 | 16.7 | 77.3 |
| 2 | 203.1 | 196.9 | 6.3 | 29.5 |
| 3 | 684.4 | 715.6 | 16.7 | 100.2 |

As shown in Table 6, a maximum cell radius supported by LTE is 100.2 km, and at least the cell radius of the same level is required for an in-band operation using an LTE network.

The NPRACH of the NB-IoT in the related art is designed to support up to 35 km of cell radius based on a GSM network. The NPRACH format supported by the NB-IoT in the related art is shown in Table 7 below.

TABLE 7

| Preamble format | CP duration (us) | GT duration (us) | Max. cell radius (km) |
|---|---|---|---|
| 0 | 67.5 | N/A | 10.1 |
| 1 | 266.7 | N/A | 40.0 |

As shown in Table 7, the random access preamble of the NB-IoT does not explicitly define a guard time.

The random access procedure of the NB-IoT may support a 4-Step contention based RACH procedure similar to LTE in the related art as follows:

1) MSG 1: RA preamble transmission (UE→eNB)
2) MSG 2: Receiving Random Access Response (RAR) from the eNB and RARs including a TA command and msg 3 scheduling (UE←eNB)
3) Msg 3: RA message including an RRC connection request and UE id (UE→eNB)
4) Msg 4: Contention resolution messages including an RRC connection configuration and the UE id (UE←eNB)

Operations after Msg 4 include HARQ-ACK for msg 3, transmission of an RRC connection setup complete message including the UE id, etc.

Considering even Evolved Packet System (EPS) enhancement for the NB-IoT, the NB-IoT may support two types of following random access procedures.

Control Plane EPS Optimization

1) Msg 1: Transmitting the RA preamble
2) Msg 2: Receiving the Random Access Response (RAR) from the eNB and the RARs including the TA command and the msg 3 scheduling
3) Msg 3: Transmitting and receiving the RRC connection request
4) Msg 4: RRC connection configuration
5) Msg 5: RRC connection setup complete (including an NAS PDU for data)

User Plane EPS Optimization

1) Msg 1: Transmitting the RA preamble
2) Msg 2: Receiving the Random Access Response (RAR) from the eNB and the RARs including the TA command and the msg 3 scheduling
3) Msg 3: Transmitting and receiving the RRC connection request
4) Msg 4: Resuming the RRC connection
5) Msg 5: Completing the resuming of the RRC connection
6) Transmission of (N)PUSCH(UL date)

From the viewpoint of UL data transmission, first UL data transmission is possible in msg 5 in the case of the control plane EPS optimization and the first UL data transmission is possible after msg 5 in the case of the user plane EPS optimization.

Since the existing NB-IoT is designed based on a GERAN network supporting a cell radius of 35 km, the cyclic prefix (CP) of the random access preamble is designed to support only up to approximately a maximum of 40 km. However, considering the in-band operation in the LTE network, which is one of representative deployment scenarios of the NB-IoT, it is necessary to support a maximum cell radius of 100 km supported by the LTE network.

It is also necessary to support a large cell radius, even considering that an NB-IoT user case includes use in a location where the LTE network where is not well equipped.

In order to support cell radius extension, the CP needs to be extended. For example, in order to support a cell radius of 100 km, a CP having a length covering a round trip time should be used, and a minimum length of the required CP is calculated by Equation 3 below.

$$\text{CP length (us)}=200 \text{ km}/(3\text{E}8 \text{ m/s})=666.7 \text{ us} \quad [\text{Equation 3}]$$

In order to support such a large cell radius, the extended CP is called an extended CP (E-CP). Additionally, considering the delay spread, the length of the E-CP may be designed to have a slight margin. Further, in order to avoid overlapping of the random access preamble received from the UE from the viewpoint of the eNB with an immediately next adjacent subframe, a guard time (GT) of a length (666.7 us) like the E-CP between a frame and a next subframe capable of performing uplink transmission is required.

It is necessary for the eNB to individually control the uplink transmission timing of each UE for uplink orthogonal transmission and reception. Such a process is referred to as a timing advance (TA) and an initial timing advance is performed through the random access procedure.

In the NB-IoT, when the UE transmits the random access preamble, the eNB estimates the uplink transmission delay from the received preamble and encapsulates the estimated uplink transmission delay in the random access response (RAR) message in the form of a timing advance command and transmits the RAR message to the UE. The UE may adjust uplink transmission timing through the TA command delivered through the RAR message.

The random access preamble of the NB-IoT is a single carrier frequency hopping scheme and is designed by considering both a timing estimation acquisition range and accuracy. The subcarrier spacing of the random access preamble in the related art is designed to enable timing estimation without ambiguity up to a cell radius of 40 km at 3.75 kHz.

When the timing estimation is intended to be performed using a spacing between two subcarriers, the cell radius supportable without the ambiguity may be calculated as follows. When being estimated using the spacing between two separated subcarriers, a difference between two phases is 2*pi*delta_f. Here, delta_f represents the spacing between two subcarriers in Hz.

In order for a phase value to have a one-to-one correspondence with the cell radius, a relationship of 2*pi*delta_f*tau_RTT<2*pi needs to be established, and as a result, a relationship of tau_RTT<1/delta_f needs to be established for estimation without the ambiguity and a roundtrip distance is tau_RTT*(3E8 m/s). Therefore, the cell radius is 1/delta_f*3E8/2=1/3.75 kHz*3E8 (m/s)/2=40 km.

Since a cell radius capable of performing the timing estimation without the ambiguity is 40 km at 3.75 kHz subcarrier spacing of the random access preamble in the related art, the subcarrier spacing needs to be reduced to 1.5 kHz or less in order to support a cell radius of 100 km.

As described above, a preamble newly proposed to support the 100 km cell radius may be referred to as an enhanced preamble or an enhanced NPRACH in the present invention. In contrast, the random access preamble in the related art may be referred to as a legacy preamble or legacy NPRACH.

Figure 6:
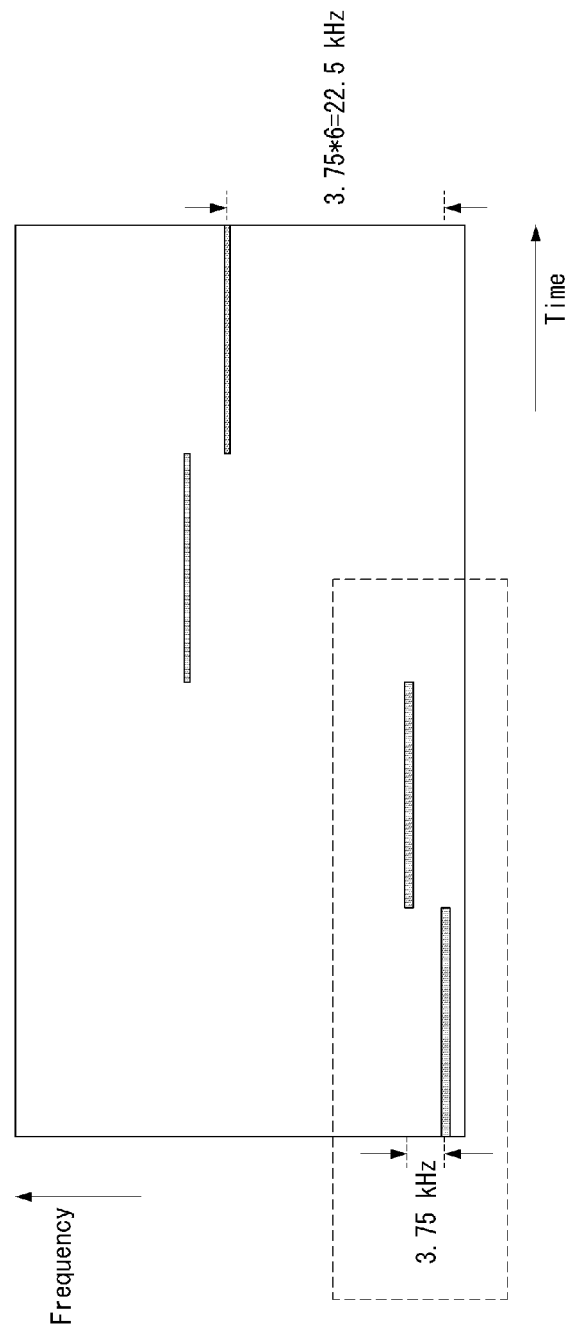
FIGS. 6 and 7 are diagrams illustrating an example of a hopping interval of a preamble in a wireless communication system to which a method proposed in this specification may be applied.
Figure 7:
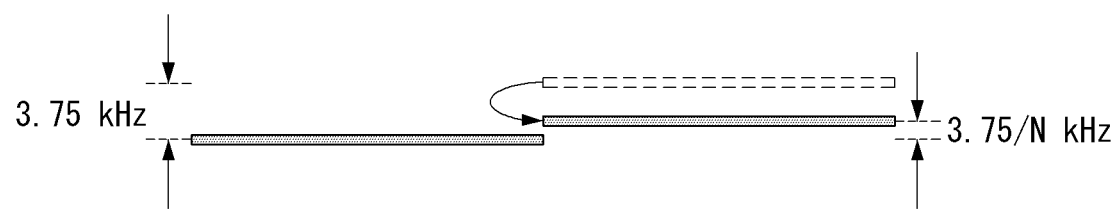

FIGS. 6 and 7 are diagrams illustrating an example of a hopping interval of a preamble in a wireless communication system to which a method proposed in this specification may be applied.

FIG. 6 illustrates a frequency hopping interval of the legacy preamble and as illustrated in FIG. 6, in the case of the legacy preamble, frequency hopping is performed with an integer multiple of a subcarrier of 3.75 kHz.

The value of the subcarrier spacing of the enhanced preamble may be 1/N times (N is a positive integer) of 3.75 kHz in consideration of delay spread, interference that may occur when performing FDM with the legacy preamble, and the like. For example, when N is '3', the subcarrier spacing of the enhanced preamble becomes 1.25 kHz which is ⅓ of 3.75 kHz and the cell radius may be supported up to 120 km.

Hereinafter, an enhanced preamble format may be referred to as format 2 and a legacy preamble format may be referred to as format 0 or format 1.

Table 8 below shows an example of a subcarrier spacing ($\Delta f_{RA}$) depending on the preamble format.

TABLE 8

| Preamble format | $\Delta f_{RA}$ | |
|---|---|---|
| | Frame Structure Type 1 | Frame Structure Type 2 |
| 0, 1 | 3.75 kHz | |
| 0-a, 1-a | | 3.75 kHz |
| 2 | 1.25 kHz | 3.75 kHz |

FIG. 7 illustrates the subcarrier spacing of the enhanced preamble and a minimum frequency hopping interval compared to legacy 3.75 kHz (indicated by a dotted line).

In addition, a method for reducing the subcarrier spacing of the NPRACH may support a larger number of preambles in the same bandwidth than the legacy preamble through FDM. However, due to an increase in symbol duration, a preamble duration may be increased.

In terms of the time estimation, since as a minimum frequency hopping distance is reduced, a timing acquisition range is increased while a residual error is increased after acquisition, a failure probability compared to the legacy preamble may be increased assuming the same maximum frequency hopping distance as the legacy preamble.

Hereinafter, an enhanced NPRACH structure will be described.

Figure 8A:
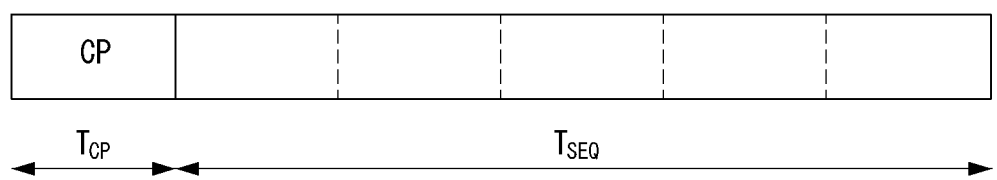
FIGS. 8A and 8B illustrate an example of a symbol group for a random access in a wireless communication system to which a method proposed in this specification may be applied.
Figure 8B:
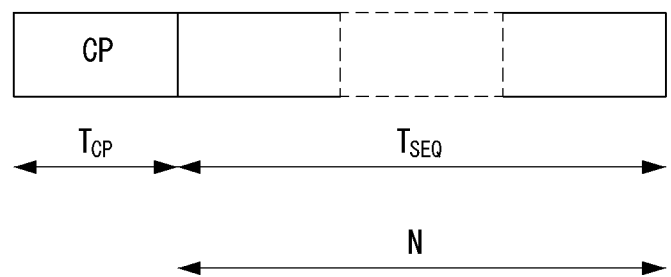

FIGS. 8A and 8B illustrate an example of a symbol group for a random access in a wireless communication system to which a method proposed in this specification may be applied.

FIG. 8A illustrates an example of the symbol group of the legacy preamble and FIG. 8B illustrates an example of the symbol group of the enhanced preamble.

The enhanced preamble may be designed to satisfy the following requirements by considering a problem due to a change in subcarrier spacing of the enhanced preamble and sharing or overlapping of a time/frequency resource with the legacy preamble.

i) The number of symbols constituting the symbol group may be reduced to limit an excessive increase of the preamble duration. For example, in order to limit the excessive increase of the preamble duration, the symbol group may be limited to be constituted by one CP and three symbols as illustrated in FIG. 8B. That is, the symbol group may be constituted by a total of four symbol durations (in the case of the legacy preamble, the symbol group is constituted by one CP and five symbols (a total of six symbols durations) as illustrated in FIG. 8A).

ii) An intermediate frequency hopping distance may be included in the preamble in order to preserve performance in the time estimation. For example, assuming 1.25 kHz subcarrier spacing (N=3), the minimum hopping distance may be 1.25 kHz and the maximum hopping distance may be 1.25*18 kHz (=3.75*6 kHz) to maintain similar accuracy to the legacy preamble, and the intermediate frequency hopping distance may be 1.25*3 kHz or 1.25*6 kHz.

iii) The same NPRACH bandwidth as the legacy preamble may be maintained (45 kHz) to limit the sharing or overlapping of the time/frequency resource with the legacy preamble or implementation complexity. Assuming the 1.25 kHz subcarrier spacing (N=3), it is possible to allocate the enhanced NPRACH resource through up to a maximum of 36 starting subcarrier indexes within a 45 kHz NPRACH bandwidth and each enhanced preamble may perform frequency hopping within 36 subcarriers (45 kHz NPRACH bandwidth).

iv) Maximum enhanced NPRACH resource utilization needs to be able to be provided within the NPRACH bandwidth (45 kHz). For example, all subcarrier indexes within the NPRACH bandwidth need to be able to be allocated to the enhanced NPRACH resource.

As a method for satisfying the requirements, the following enhanced preamble structure is proposed by assuming the 1.25 kHz (N=3) subcarrier spacing and the case where the symbol group is constituted by one CP and three symbols (a total of four symbol durations).

The following preamble structure may be similarly to applied even to a case in which there is another subcarrier spacing value other than 1.25 kHz (N=3) and a case in which the symbol group is different. In the following proposal, k (k is an integer having a value from 0 to 35) represents an enhanced NPRACH starting subcarrier index within the NPRACH bandwidth. $N_{SG}$ represents the number of symbol groups within the enhanced NPRACH.

Embodiment 1

The enhanced NPRACH structure may have the following features.
  The enhanced NPRACH structure is constituted by six symbol groups ($N_{SG}$=6).
  Six symbol groups may support three (maximum, intermediate, and minimum) frequency hopping distances. For example, three hopping distances may be (1, 3, 18)*1.25 kHz.
  With respect to the minimum and intermediate hopping distances, symmetric frequency hopping may be supported for carrier frequency offset (CFO) cancellation.
  The symmetric frequency hopping means a case where two frequency hopping is the same in terms of the hopping distance and opposite in terms of the hopping direction. Two frequency hopping providing symmetric hopping may be referred to as a symmetric hopping pair. For example, when three frequency hopping distances are constituted by (1, 3, 18)*1.25 kHz, frequency hopping of ±1.25 kHz and ±1.25*3 kHz may be applied.
  Minimum distance or separation between the symmetric hopping pair
  The distance or separation is displayed in units of the symbol group. For example, since a frequency hopping pattern is [$k_0$, $k_{-1}$±1, $k_{-1}$∓1, $k_{-1}$±3, $k_{-1}$∓3, ($k_{-1}$+18) mod 36] in Embodiment 1-1 and FIGS. 9A and 9B below, the minimum hopping distance is 1 and the intermediate hopping distance is 1.

Embodiment 1-1

Figure 9A:
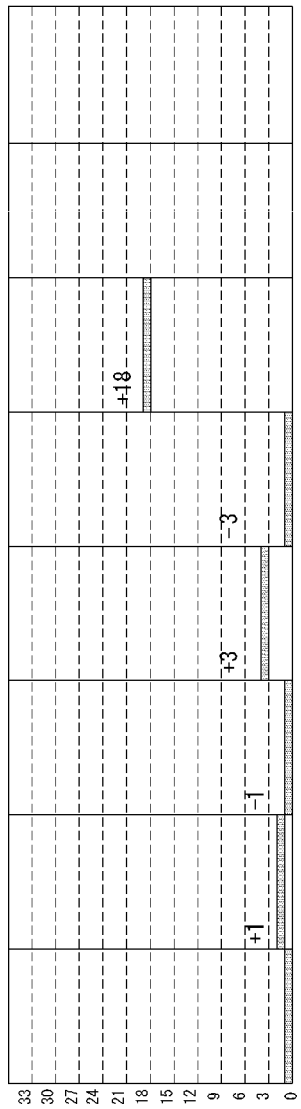
FIGS. 9A and 9B are diagrams illustrating an example of a frequency hopping method of a random access preamble proposed in this specification.
Figure 9B:
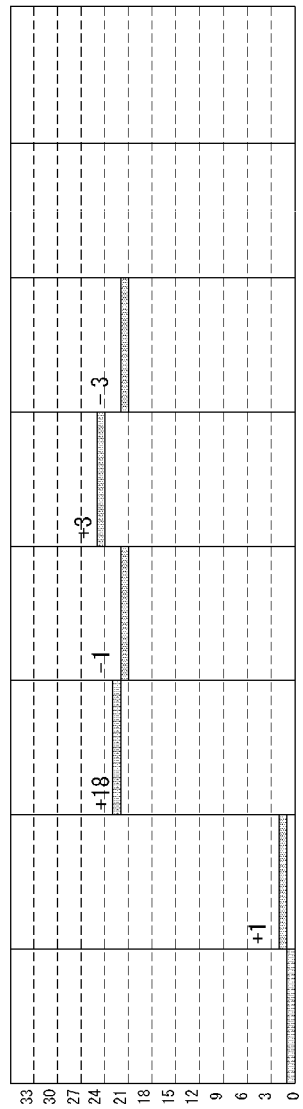

FIGS. 9A and 9B are diagrams illustrating an example of a frequency hopping method of a random access preamble proposed in this specification.

Referring to FIG. 9A, the frequency hopping of the symbol group for the enhanced preamble may have the symmetric hopping pair, and the frequency hopping may be performed in a pattern having a hopping interval larger than the subcarrier of the previous symbol group.

For example, as illustrated in FIG. 9A, the frequency hopping pattern in the preamble structure of Embodiment 1 may be as follows.

$$[k_0, k_{-1}\pm1, k_{-1}\mp1, k_{-1}\pm3, k_{-1}\mp3, (k_{-1}+18)\bmod 36]$$

In the above hopping pattern, $k_0$ ($k_0$ is an integer having a value from 0 to 35) represents the enhanced NPRACH starting subcarrier index within the NPRACH bandwidth and $k_{-1}$ represents the subcarrier index of the previous symbol group.

According to the above mapping pattern, the location to be hopped according to the subcarrier index of the previous symbol group may be relatively determined from the second symbol group. That is, the location of the subcarrier to which the symbol group for transmission of the preamble is mapped may be determined to be different by a specific subcarrier index based on the subcarrier location to which the previous symbol group is mapped.

$N_{SG}$ elements in square brackets indicate the subcarrier index of each symbol group. Hereinafter, in the present invention, frequency hopping patterns of $N_{SG}$ symbol groups constituting the enhanced preamble by the above notation are displayed.

M the above mapping pattern, '±' means that the corresponding symbol group for transmission of the enhanced preamble may be hopped in a '+' or '-' direction according to the subcarrier index of the previous symbol group.

For example, in the above pattern, when $k_0$ is '0', the hopping pattern may be [0, 1, 0, 3, 0, 18] and when $k_0$ is '1', the hopping pattern may be [1, 0, 1, 4, 1, 19].

Further, '±' and '∓' are represented to be distinguished from each other and when hopping distances of two symbol groups are the same as each other and are expressed by '±' and '∓', the two symbol groups may mean the symmetric hopping pair.

That is, the subcarrier index is increased by the same value based on the subcarrier index of the previous symbol group and the reduced symbol groups may form the symmetric hopping pair, and an effect of the CFO cancellation may be obtained due to the symmetric hopping pair.

In Embodiment 1-1, when the value of $N_{SG}$ is '6' together with the feature of Embodiment 1, the minimum distance or the separation between the symmetric hopping pair may be smallest in the enhanced preamble structure. For example, in the case of the hopping pattern described as an example in Embodiment 1-1, the minimum hopping distance and the intermediate hopping distance are '1'.

Embodiment 1-2

The frequency hopping of the symbol group for the enhanced preamble may be performed in a pattern in which the index value is increased or decreased by a specific value based on the subcarrier index of the previous symbol group.

For example, as illustrated in FIG. 9B, the hopping pattern for the subcarrier of the symbol group transmitting the enhanced preamble for the NPRACH may be as follows.

$$[k_0, k_{-1}\pm1, (k_{-1}+18)\bmod 36, k_{-1}\mp1, k_{-1}\pm3, k_{-1}\mp3]$$

In Embodiment 1-2, which is the same mapping pattern as the mapping pattern illustrated in FIG. 9B, the accuracy may be enhanced because error measurement of the symmetric hopping pair of the minimum hopping distance is more independent as compared with Embodiment 1-1 together with the feature of Embodiment 1, but there may be a disadvantage in terms of the minimum distance or the symmetric hopping pair as compared with Embodiment 1-1 because the minimum hopping distance and the intermediate hopping distances are 2 and 2, respectively.

Embodiment 2

The enhanced NPRACH structure may have the following features.
- The enhanced NPRACH structure is constituted by seven symbol groups ($N_{SG}=7$).
- Seven symbol groups may support three (maximum, intermediate, and minimum) frequency hopping distances. For example, three hopping distances may be (1, 3, 18)*1.25 kHz.
- With respect to the minimum and intermediate hopping distances, symmetric frequency hopping may be supported for carrier frequency offset (CFO) cancellation.
- The symmetric frequency hopping means a case where two frequency hopping is the same in terms of the hopping distance and opposite in terms of the hopping direction. Two frequency hopping providing symmetric hopping may be referred to as a symmetric hopping pair. For example, when three frequency hopping distances are constituted by (1, 3, 18)*1.25 kHz, frequency hopping of ±1.25 kHz and ±1.25*3 kHz may be applied.
- Minimum distance or separation between the symmetric hopping pair

Embodiment 2-1

Figure 10:
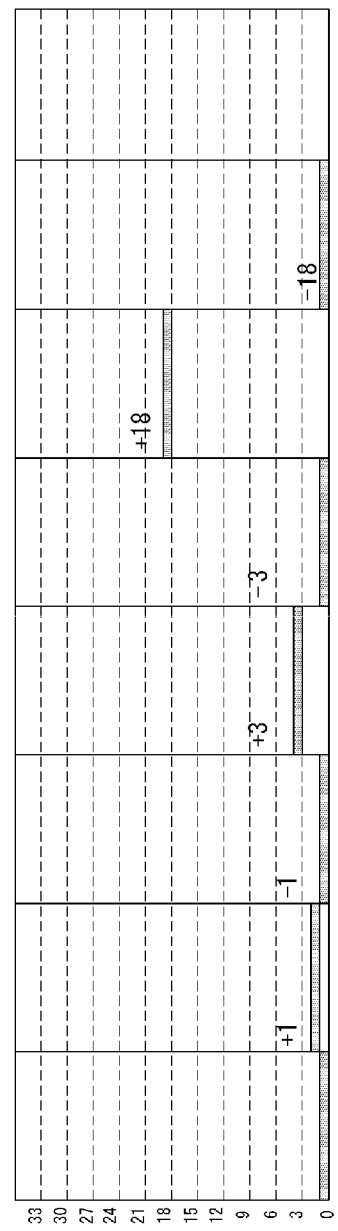
FIG. 10 is a diagram illustrating another example of a frequency hopping method of a random access preamble proposed in this specification.

FIG. 10 is a diagram illustrating yet another example of a frequency hopping method of a random access preamble proposed in this specification.

Referring to FIG. 10, the frequency hopping of the symbol group for the enhanced preamble may have the symmetric hopping pair, and the frequency hopping may be performed in a pattern having a hopping interval larger than the subcarrier of the previous symbol group. In this case, hopping patterns for more symbols groups than Embodiment 1-1 or 1-2 may be added.

For example, as illustrated in FIG. 10, the frequency hopping pattern in the preamble structure of Embodiment 2-1 may be as follows.

$$[k_0, k_{-1} \pm 1, k_{-1} \mp 1, k_{-1} \pm 3, k_{-1} \mp 3, k_{-1} \pm 18, k_{-1} \mp 18]$$

Embodiment 2-1 is a structure in which the value of $N_{SG}$ is extended to '7' based on the structure described in Embodiment 2. The symmetric hopping pair for the CFO cancellation may be supported even in the maximum hopping distance through the added last symbol group as compared with Embodiments 1-1 and 1-2 in which the value of $N_{SG}$ is '6'.

That is, the mapping pattern may be configured so that by setting the number of symbol groups for transmission of the enhanced preamble to an even number except for the first symbol group (i.e., the total number of symbol groups is odd), all of the subcarriers of the remaining symbol groups except for the subcarriers of the first symbol group form the symmetric hopping pair.

By using such a mapping pattern, the performance may be improved at the time of fine timing estimation using the maximum hopping distance.

In addition, the minimum hopping distance, the intermediate hopping distance, and the maximum hopping distance which are all 1 and are thus effective in terms of the minimum distance or the separation between the symmetric hopping pair similarly to Embodiment 1-1.

Embodiment 3

The enhanced NPRACH structure may have the following features.
- The enhanced NPRACH structure is constituted by eight symbol groups ($N_{SG}=8$).
- Eight symbol groups may support three (maximum, intermediate, and minimum) frequency hopping distances. For example, three hopping distances may be (1, 3, 18)*1.25 kHz.
- With respect to the minimum and intermediate hopping distances, symmetric frequency hopping may be supported for carrier frequency offset (CFO) cancellation.
- The symmetric frequency hopping means a case where two frequency hopping is the same in terms of the hopping distance and opposite in terms of the hopping direction. Two frequency hopping providing symmetric hopping may be referred to as a symmetric hopping pair. For example, when three frequency hopping distances are constituted by (1, 3, 18)*1.25 kHz, frequency hopping of ±1.25 kHz, ±1.25*3 kHz, and ±1.25*18 kHz may be applied.
- Minimum distance or separation between the error measurements of the same hopping distance

Embodiment 3-1

Figure 11:
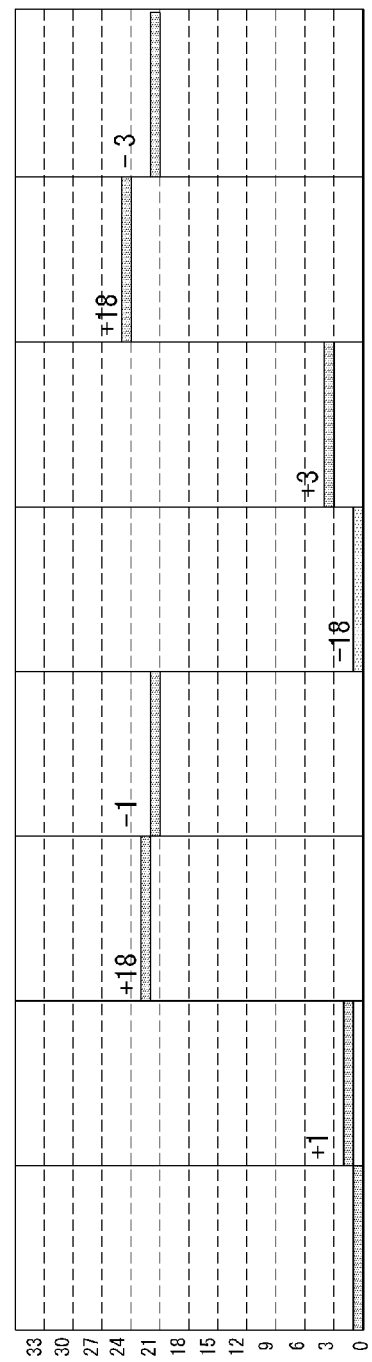
FIG. 11 is a diagram illustrating yet another example of a frequency hopping method of a random access preamble proposed in this specification.

FIG. 11 is a diagram illustrating yet another example of a frequency hopping method of a random access preamble proposed in this specification.

Referring to FIG. 11, the frequency hopping of the symbol group for the enhanced preamble may have the symmetric hopping pair, and the frequency hopping may be performed in a pattern having a hopping interval larger than the subcarrier of the previous symbol group. In this case, hopping patterns for more symbols groups than Embodiment 2-1 may be added.

For example, as illustrated in FIG. 11, the frequency hopping pattern in the preamble structure of Embodiment 3-1 may be as follows.

$$[k_0, k_{-1} \pm 1, k_{-1} \mp 18, k_{-1} \pm 1, k_{-1} \mp 18, k_{-1} \pm 3, k_{-1} \mp 18, k_{-1} \mp 3]$$

Since the embodiment 2-1 has a duration corresponding to four times (that is, $2^2$ times) the legacy NPRACH duration, in the case of the legacy NPRACH resource sharing or overlapping, the time resource may be used efficiently.

For example, when the legacy NPRACH supports 128 repetitive transmissions at CE level 2, Embodiment 3-1 shares or overlaps the legacy NPRACH resource and sets the number of repetitive transmissions to 32 so that the time resource may be efficiently used without waste.

Moreover, in the case of the legacy UE, whenever the NPRACH is transmitted repeatedly 64 times for synchronization with the network and/or measurement, a time gap of 40 ms is inserted and even in Embodiment 3-1, the UE operates similarly to the legacy UE in terms of insertion of the time gap and the NPRACH resource may be shared or overlapped without influencing the legacy UE.

In the case of Embodiment 3-2, the minimum, intermediate, and maximum hopping distances are '2', '2', and '2', respectively.

In the enhanced NPRACH structures of Embodiments 1 to 3, in order to satisfy a requirement (Maximum enhanced NPRACH resource utilization should be able to be provided within the NPRACH bandwidth (45 kHz). For example, all subcarrier indexes within the NPRACH bandwidth should be able to be allocated to the enhanced NPRACH resource.) of iv) described above, the following method may be applied to each frequency hopping distance.

The subcarrier index of a current symbol group may be determined according to the location of a subcarrier index ($k_{-1}$) of the previous symbol group.

For frequency hopping for a hopping distance 'J',
  in the case of $k_{-1}$ Mod $2*J<J$, $k_{-1}+J$
  in the case of $k_{-1}$ Mod $2*J \geq J$, $k_{-1}-J$ For example, when the minimum, intermediate, and maximum frequency hopping distances are 1, 3, and 18, respectively, the subcarrier index of the current symbol group may be determined as follows based on the location of the subcarrier index ($k_{-1}$) of the previous symbol group.

minimum frequency hopping (minimum hopping distance=±1)
    in the case of $k_{-1}$ Mod 2=0, $k_{-1}+1$
    in the case of $k_{-1}$ Mod 2=1, $k_{-1}-1$
  intermediate frequency hopping (intermediate hopping distance=±3)
    in the case of $k_{-1}$ Mod 6<3, $k_{-1}+3$
    in the case of $k_{-1}$ Mod 6≥3, $k_{-1}-3$
  maximum frequency hopping (maximum hopping distance=±3)
    in the case of $k_{-1}<18$, $k_{-1}+18$
    in the case of $k_{-1} \geq 18$, $k_{-1}-18$ That is, by comparing the value of the subcarrier index of the previous symbol group with a specific value, the subcarrier index of the symbol group for the frequency hopping may be determined.

Embodiments 1-1 and 1-2 do not support the symmetric frequency hopping for the maximum frequency hopping distance (1.25*18 kHz) due to the limitation of the number of symbol groups in the preamble.

That is, since the number of symbol groups is limited only to a maximum of 6, the subcarriers of the symbol group are not symmetric at the maximum hopping distance.

Figure 12A:
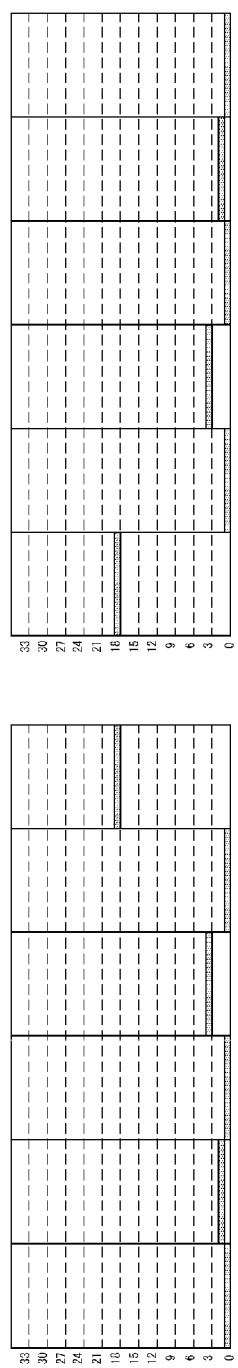
FIGS. 12A and 12B are diagrams illustrating still yet another example of a frequency hopping method of a random access preamble proposed in this specification.
Figure 12B:
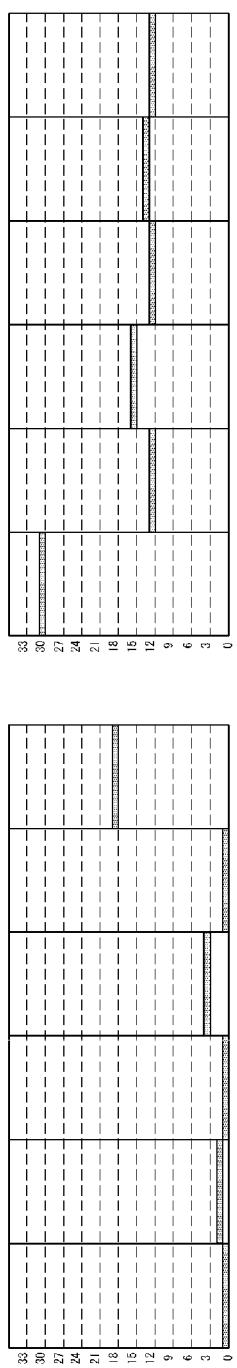

FIGS. 12A and 12B are diagrams illustrating still yet another example of a frequency hopping method of a random access preamble proposed in this specification.

Referring to FIGS. 12A and 12B, when the symmetric frequency hopping is not supported at the maximum hopping distance, the symmetric hopping pair may be formed in an entire duration in which the preamble is transmitted, by supporting the symmetric frequency hopping between repeated transmissions of preambles.

For the maximum hopping distance for the fine timing estimation, the symmetric hopping pair may be supported between repeated transmissions of the enhanced preamble in order to enhance the performance through the CFO cancellation by the following method.

If the preamble repetition number is Rmax and the preamble repetition index is r (r=0, 1, 2, . . . , Rmax−1),
    when r mode 2 is '0', the enhanced preamble may be generated through the method of Embodiment 1. In this case, if r>0, a starting subcarrier index of every repetition of the enhanced preamble may be generated (pseudo)randomly for inter-cell interference randomization.
    when r mode 2 is '1', the mapping pattern such as the symmetric hopping pair may be formed by using the enhanced preamble generated a previous repetition index (r−1) and the following method.
  The mapping pattern such as the symmetric hopping pair may be configured by mirroring the hopping pattern of the enhanced preamble generated in the previous repetition index (r−1) on a time reversal or time axis or configuring the hopping pattern of the enhanced preamble to be symmetric on the time axis.

In this case, the starting subcarrier index is equal to a last subcarrier index of the symbol group in the previous repetition index (r−1) as illustrated in FIG. 12A or the starting subcarrier index is generated (or configured) (pseudo-)randomly in order to additionally perform the inter-cell interference randomization and the location of the starting subcarrier index may be limited.

For example, as illustrated in FIG. 12B, in Embodiment 1-1, when the subcarrier index of the last symbol group of the previous repetition index (r−1) is smaller than 18 so that the symmetric hopping pair between the subcarriers is formed for the maximum hopping distance, the starting subcarrier index may be (pseudo)randomly selected among values smaller than 18 and when the subcarrier index of the last symbol group in the previous repetition index (r−1) is equal to or larger than 18, the starting subcarrier index may be (pseudo)randomly selected among values among values equal to or larger than 18.

That is, when the maximum number of symbol groups is an even number, the symmetric hopping pair between the subcarriers is not formed at the maximum hopping distance. Therefore, the subcarrier index of the symbol group may be configured so as to have the symmetric frequency hopping form between repeated transmissions by using repeated transmission characteristics of the enhanced preamble.

Even when the symmetric hopping pair is not formed at the maximum hopping distance according to the number of symbol groups by using such a method, the symmetric frequency hopping pair between repeated transmissions may be formed and the CFO cancellation may be performed.

Embodiment 5

Figure 13:
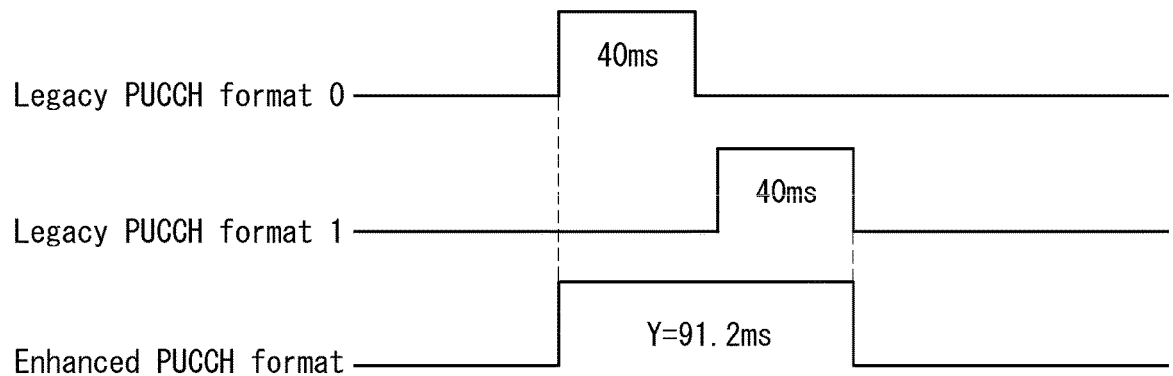
FIG. 13 is a diagram illustrating an example of a time gap configuring method of a random access preamble proposed in this specification.

FIG. 13 is a diagram illustrating an example of a time gap configuring method of a random access preamble proposed in this specification.

Referring to FIG. 13, when the enhanced preamble or an improved NPRACH or the enhanced NPRACH is repeatedly transmitted, the time gap is inserted in the middle of the repeated transmission, thereby preventing synchronization between the UE and the eNB from varying due to repeated transmission.

Specifically, when the UE repeatedly transmits the enhanced NPRACH for a long period of time, it may occur that the uplink transmission is stopped in the middle and a downlink signal is received from the network in order to periodically synchronize with the network.

In order to provide a synchronization period as in the legacy UE, the enhanced NPRACH may be transmitted during an 'X' duration from a transmission start time of the enhanced NPRACH and uplink transmission may be delayed or punctured during a 'Y' duration.

Delaying in the present invention may mean that uplink transmission data is held during the 'Y' duration and enhanced NPRACH transmission is resumed in succession to data which is previously transmitted again at a time after the 'Y' duration.

Further, puncturing in the present invention may mean that data generated during the 'Y' duration is skipped or discarded from a start time when the uplink transmission is stopped and transmission is resumed from the enhanced NPRACH after the data is skipped or discarded during the 'Y' duration.

That is, in the case of the enhanced preamble, since the length and the structure of the symbol for preamble transmission vary as described above, the gap may be inserted in the middle of the repeated transmission of the enhanced preamble in order to prevent the synchronization from being changed by repeatedly transmitting the enhanced preamble over a long interval.

In other words, when the length and the structure of the symbol for transmission of the enhanced preamble are configured differently from the length and the structure of the symbol for transmission of the legacy preamble, and the enhanced preamble is repeatedly transmitted for a long time, the UE and the eNB may synchronize with each other.

Therefore, it is necessary to prevent the UE and the eNB from synchronizing with each other by inserting the gap in the middle of the repeated transmission of the enhanced preamble.

In this case, since the uplink transmission is not performed in the inserted gap duration, data generated during the gap duration may be skipped or transmission of uplink data may be held and transmission of the enhanced preamble may be performed again from a duration after the gap.

The time when the enhanced NPRACH transmission is performed again may be a time when the 'Y' duration ends or limited to a 1 ms unit or a boundary of the subframe. In this case, in the latter case, the uplink transmission may be delayed during the 'Y' duration or the enhanced NPRACH transmission may be resumed in the first 1 ms unit (or subframe boundary) after puncturing.

In this case, a value of 'X' for inserting the gap duration may be set through two methods described below.

(Method 1)

The duration 'X' for inserting the gap for repeated transmission of the enhanced preamble may be determined based on the repeated transmission period of the legacy preamble.

Specifically, the subcarrier spacing of the enhanced preamble is reduced by one-third times compared to the subcarrier spacing of the legacy preamble and the symbol interval is increased by three times. Therefore, although the symbol durations of the legacy preamble and the enhanced preamble do not clearly coincide with each other, an enhanced preamble gap setting period 'X' may be set based on the transmission period of the legacy preamble in order to maintain compatibility with the legacy preamble.

For example, the value of 'X' may be set as shown in Equation 4 below.

$$X = 64 * T_{P,L}$$ [Equation 4]

In Equation 4, $T_{P,L}$ may denote a legacy preamble duration (ms).

In the case of Method 1, the gap setting duration 'X' of the enhanced preamble may be set using the same value as the gap setting duration 'X' in the legacy preamble.

That is, when the legacy preamble is repeatedly transmitted, the value of 'X' is set based on an integer multiple of the legacy preamble duration, and as a result, when legacy NPRACH time/frequency resources are shared or the resources are overlapped, a collision with the legacy NPUSCH scheduled during the Y duration may be avoided.

(Method 2)

The duration 'X' for inserting the gap for repeated transmission of the enhanced preamble may be determined based on the repeated transmission period of the enhanced preamble.

Specifically, the value of 'X' may be determined based on one of the values equal to or smaller than '64', which is an integral multiple of the symbol duration of the enhanced NPRACH and the number of repetitions of the legacy NPRACH.

That is, in the case of the structure (i.e., the preamble format 2) according to the enhanced preamble format, the gap setting duration 'X' of the enhanced preamble may be set according to Equation 5 below.

$$X = N * T_{P,E}$$ [Equation 5]

In Equation 5, $T_{P,E}$ may denote an enhanced preamble duration (ms). That is, $T_{P,E}$ denotes a duration in which the enhanced preamble is transmitted.

'X' denotes a value for delaying or puncturing the uplink transmission in units of the enhanced preamble. That is, after the enhanced preamble is repeatedly transmitted during the 'X' duration, the gap may be inserted.

In other words, the UE may repeatedly transmit the preamble to the eNB during the 'X' duration and delay or puncture the uplink transmission as described above during the gap duration or perform an operation of synchronization with the eNB so as to prevent the UE and the eNB from being synchronized with each other.

Thereafter, when the gap duration ends, the UE may repeatedly transmit the enhanced preamble to the eNB again.

In Equation 5, N may be set to a maximum value among non-negative integers to satisfy the condition of Equation 6 below or a maximum value among repetition frequency values supported by the enhanced NPRACH.

$$N * T_{P,E} \leq 64 * T_{P,L}$$ [Equation 6]

That is, the value of N may mean the number of times the enhanced preamble is repeatedly transmitted and may be set to a maximum value satisfying Equation 5.

$T_{P,L}$ is configured by $4(T_{CP}+T_{SEQ})$ and $T_{C,P}$ is configured by $6(T_{CP}+T_{SEQ})$, the value of 'N' may become 16 which is the largest value of positive numbers satisfying Equation 5 above. That is, in the case of the legacy preamble (preamble format 0 or 1), the legacy preamble may be repeatedly transmitted a predetermined number of times (for example, 64 times) during a duration of $4*64*(T_{CP}+T_{SEQ})$ and then, the gap may be inserted and in the case of the enhanced preamble (preamble format 2), the enhanced preamble may be repeatedly transmitted a predetermined number of times (e.g., 16 times) during a duration of $16*6*(T_{CP}+T_{SEQ})$ and then, the gap may be inserted.

For example, assuming that $64*T_{P,L}$ is '409.6 ms' and in the case of the preamble structure of Embodiment 1, the value of $T_{P,E}$ becomes '19.2 ms', so that the maximum positive integer N satisfying the condition of Equation 5 becomes 21.

Alternatively, when the number of repeated transmission times of the enhanced preamble supports only $2^M$ (M is a non-negative integer), that is, when the number of repeated transmission times supports only values of {1, 2, 4, 8, 16, 32}, N may become 16.

In this case, the UE may repeatedly transmit the enhanced preamble of preamble format 2 to the eNB based on configuration transmitted from the eNB a predetermined number of times during the set 'X' duration and then, may synchronize with the eNB without transmitting the enhanced preamble during the inserted gap duration.

Thereafter, when the gap duration ends, the UE may repeatedly transmit the enhanced preamble to the eNB again.

The 'X' value for the enhanced NPRACH may be a value scaled according to the $T_{P,L}$ which varies depending on the format of the legacy preamble and may adopt a value of $T_{P,L,min}$ instead of $T_{P,L}$ in the 'X' value determining method in order to use a fixed 'X' value regardless of the legacy preamble format.

Here, $T_{P,L,min}$ denotes a minimum values among values depending on the legacy preamble format.

The value 'Y' of the inserted gap may be set as follows.

(Method 1)

Similar to method 1 for obtaining the value of 'X' above, since the same synchronization time as the legacy NPRACH transmission may be required, the 'X' value may be set to 40 ms which is similar to the preamble transmission gap setting duration of the legacy UE.

In this case, the value of 'X' may be set through Method 1 or 2 described above.

That is, for compatibility with legacy UEs, the value of 'Y' may be set to the same value as that of the legacy UE.

In this case, since the 'Y' value has the same value as that of the legacy UE, the compatibility with the legacy UE is maintained.

(Method 2)

The inserted gap duration may be set to a minimum value (for example, 91.2 ms) of consecutive durations including all gap durations according to the legacy preamble format (preamble format 0 and/or 1).

In the preamble format 2, the 'Y' value may be set to the minimum value of consecutive durations so as to include all of 'Y' assuming preamble formats 0 and 1.

That is, the 'Y' value of the enhanced NPRACH may be set to the minimum value of the consecutive durations including both a 'Y1' value in legacy preamble format '0' and a 'Y2' value in preamble format '1'.

For example, if 'Y1' is 40 ms and the value of 'Y2' is 40, the value of 'Y' may be set to 91.2 ms.

The transmission resumption time of the enhanced NPRACH may be the time when the Y duration ends (the same time as the legacy NPRACH) or may be limited to the first 1 ms unit or subframe boundary after the end of the Y duration. Alternatively, the enhanced NPRACH repetition may again be resumed at the boundary of the enhanced NPRACH repetition, assuming there is no Y duration.

By using such a method, the number of repeated transmission times and the value of the inserted gap may be determined in consideration of the compatibility with the legacy UE and the resource utilization efficiency.

Figure 14:
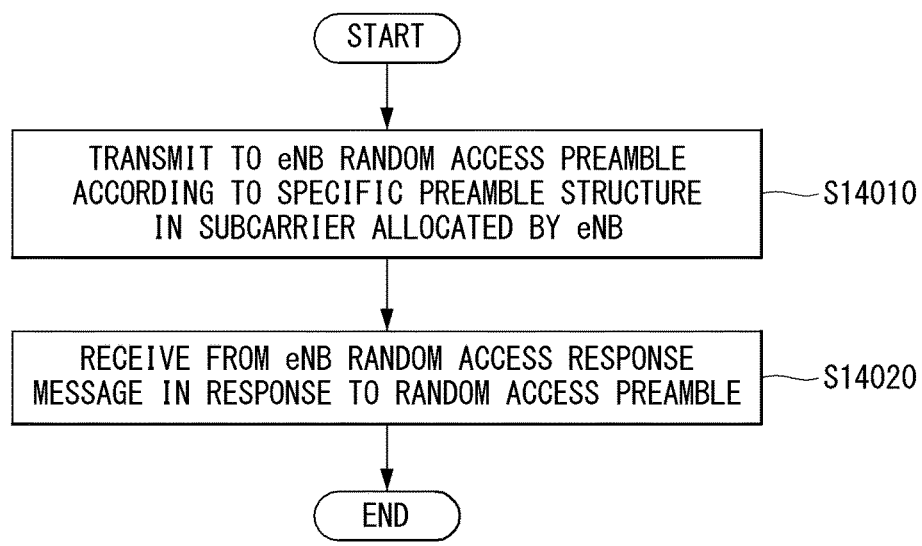
FIG. 14 is a flowchart illustrating an example of an operation method of a UE that performs a method proposed in this specification.

FIG. 14 is a flowchart illustrating an example of an operation method of a UE that performs a method proposed in this specification.

First, the UE may receive the configuration information from the eNB in order to transmit the enhanced preamble and receive downlink control information (DCI) through the configuration information.

In this case, the DCI may include resource information (e.g., a subcarrier index, etc.) for transmission of the enhanced preamble by the UE.

Thereafter, the UE transmits to the eNB a random access preamble (enhanced NPRACH or enhanced preamble) according to a specific preamble structure in the subcarrier allocated by the eNB (S14010).

In this case, the specific preamble structure may have the structures described in Embodiments 1 and 2 and may be configured similar to Preamble format 2.

For example, the specific preamble structure may be constituted by one CP and three symbols and a subcarrier gap may be set to 1.25 kHz.

Thereafter, the UE receives, from the eNB, a random access response message in response to the random access preamble (S14020).

The random access response message may include a TA command and support information for matching timing synchronization between the UE and the eNB as described above and the UE may perform uplink transmission after adjusting the timing by performing synchronization with the eNB based on the TA command.

The random access preamble may be repeatedly transmitted 16 times during a predetermined duration and the gap may be inserted for a predetermined time and the predetermined duration may be determined by multiplying a transmission duration in which the random access preamble is transmitted by the number of repeated transmission times.

That is, as described in Embodiment 5, in the case of the random access preamble, the number of repeated transmission times in which the gap is configured may be set to a specific (for example, 16) and the inserted gap may be set a value (e.g., 40 ms) for compatibility with the legacy UE or a value (e.g., 91.2 ms) including all gap values of the preamble formats of the legacy preamble.

In this case, the number of repeated transmission times may be set through the method described in Method 1 or 2 of Embodiment 5.

For example, the number of repeated transmission times may be set to an integer multiple of the symbol duration of the enhanced preamble and to a largest value among values of non-negative integers smaller than the number of repeated transmission times of the legacy preamble.

Figure 16:
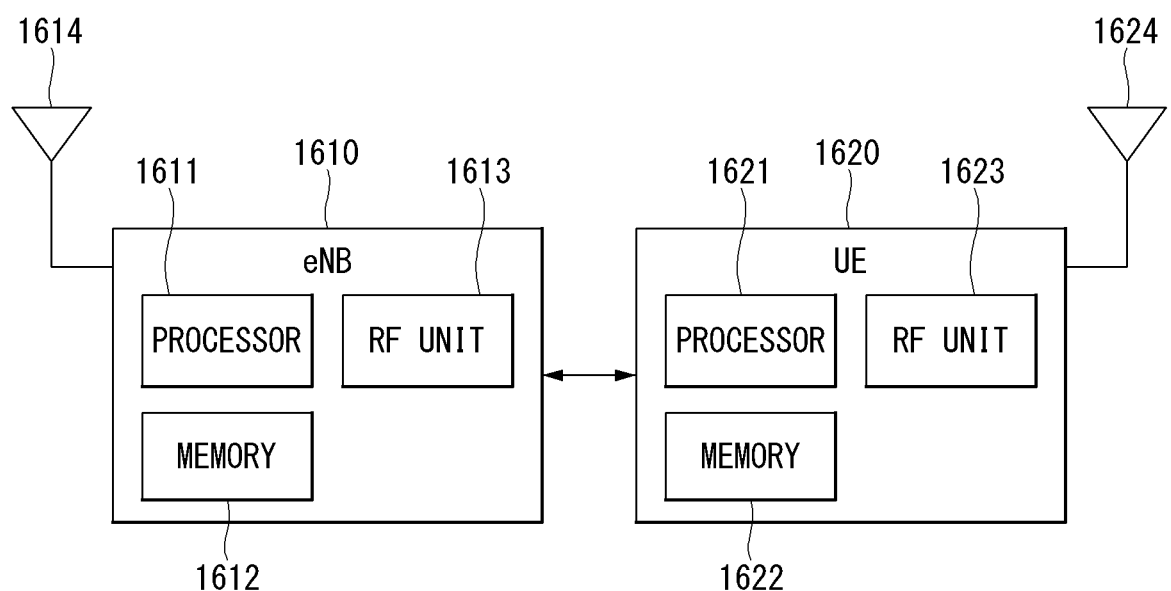
FIG. 16 illustrates a block diagram of a wireless communication device to which methods proposed in this specification may be applied.
Figure 17:
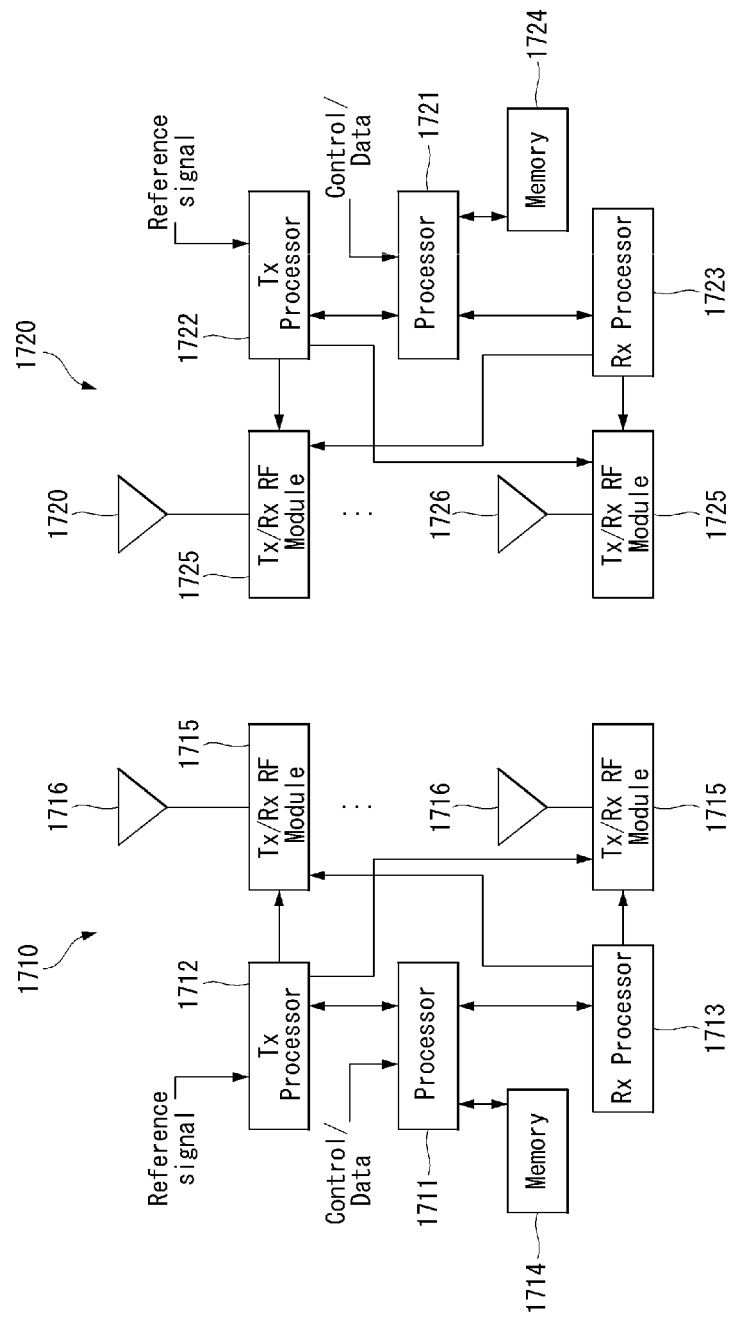
FIG. 17 illustrates another example of the block diagram of the wireless communication device to which the methods proposed in this specification may be applied.

In this regard, the operation of the UE described above may be specifically implemented by UE devices 1620 and 1720 illustrated in FIGS. 16 and 17 of this specification. For example, the operation of the UE described above may be performed by processors 1621 and 1721 and/or RF units (or modules) 1623 and 1725.

Specifically, the processors 1621 and 1721 may control to receive the configuration information from the eNB in order to transmit the enhanced preamble through the RF units (or modules) 1623 and 1725 and receive the downlink control information (DCI) through the configuration information.

In this case, the DCI may include resource information (e.g., a subcarrier index, etc.) for transmission of the enhanced preamble by the UE.

Thereafter, the processors 1621 and 1721 may control to transmit to the eNB the random access preamble (enhanced NPRACH or enhanced preamble) according to a specific preamble structure in subcarriers allocated by the eNB through the RF units (or modules) 1623 and 1725.

In this case, the specific preamble structure may have the structures described in Embodiments 1 and 2 and may be configured similar to preamble format 2.

For example, the specific preamble structure may be constituted by one CP and three symbols and a subcarrier gap may be set to 1.25 kHz.

Thereafter, the processors 1621 and 1721 may control to receive from the eNB the random access response message in response to the random access preamble through the RF units (or modules) 1623 and 1725.

The random access response message may include a TA command and support information for matching timing synchronization between the UE and the eNB as described above and the UE may perform uplink transmission after adjusting the timing by performing synchronization with the eNB based on the TA command.

The random access preamble may be repeatedly transmitted 16 times during a predetermined duration and the gap may be inserted for a predetermined time and the predetermined duration may be determined by multiplying a transmission duration in which the random access preamble is transmitted by the number of repeated transmission times.

That is, as described in Embodiment 5, in the case of the random access preamble, the number of repeated transmission times in which the gap is configured may be set to a specific (for example, 16) and the inserted gap may be set a value (e.g., 40 ms) for compatibility with the legacy UE or a value (e.g., 91.2 ms) including all gap values of the preamble formats of the legacy preamble.

In this case, the number of repeated transmission times may be set through the method described in Method 1 or 2 of Embodiment 5.

For example, the number of repeated transmission times may be set to an integer multiple of the symbol duration of the enhanced preamble and to a largest value among values of non-negative integers smaller than the number of repeated transmission times of the legacy preamble.

Figure 15:
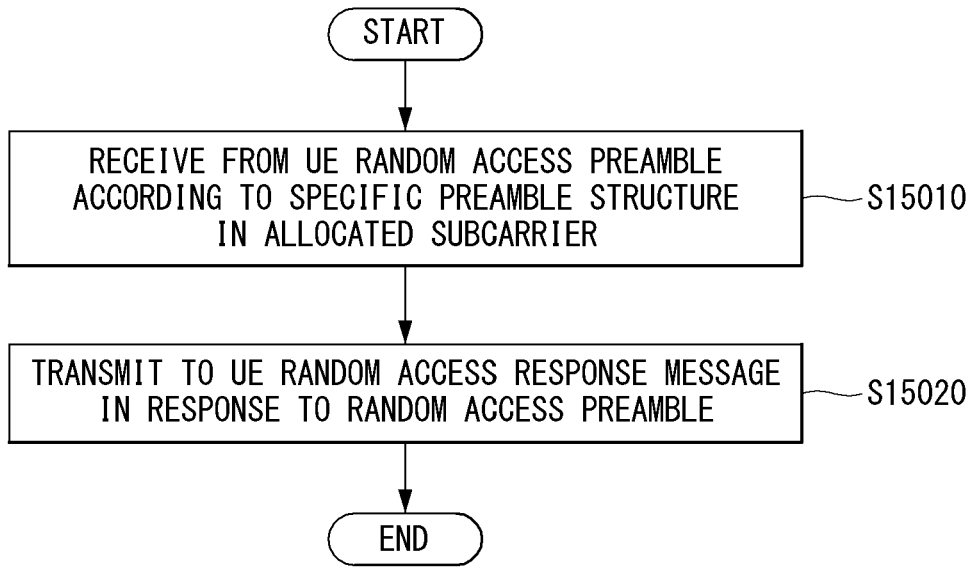
FIG. 15 is a flowchart illustrating an example of an operation method of an eNB that performs a method proposed in this specification.

FIG. 15 is a flowchart illustrating an example of an operation method of an eNB that performs a method proposed in this specification.

First, the eNB may transmit to the UE the configuration information in order to transmit the enhanced preamble and transmit the downlink control information (DCI) through the configuration information.

In this case, the DCI may include resource information (e.g., a subcarrier index, etc.) for transmission of the enhanced preamble by the UE.

Thereafter, the eNB receives from the eNB the random access preamble (enhanced NPRACH or enhanced preamble) according to the specific preamble structure in the subcarrier allocated to the UE (S15010).

In this case, the specific preamble structure may have the structures described in Embodiments 1 and 2 and may be configured similar to preamble format 2.

For example, the specific preamble structure may be constituted by one CP and three symbols and a subcarrier gap may be set to 1.25 kHz.

Thereafter, the eNB transmits, to the UE, the random access response message in response to the random access preamble (S15020).

The random access response message may include a TA command and support information for matching timing synchronization between the UE and the eNB as described above and the UE may perform uplink transmission after adjusting the timing by performing synchronization with the eNB based on the TA command.

The random access preamble may be repeatedly transmitted 16 times during a predetermined duration and the gap may be inserted for a predetermined time and the predetermined duration may be determined by multiplying a transmission duration in which the random access preamble is transmitted by the number of repeated transmission times.

That is, as described in Embodiment 5, in the case of the random access preamble, the number of repeated transmission times in which the gap is configured may be set to a specific (for example, 16) and the inserted gap may be set a value (e.g., 40 ms) for compatibility with the legacy UE or a value (e.g., 91.2 ms) including all gap values of the preamble formats of the legacy preamble.

In this case, the number of repeated transmission times may be set through the method described in Method 1 or 2 of Embodiment 5.

For example, the number of repeated transmission times may be set to an integer multiple of the symbol duration of the enhanced preamble and to a largest value among values of non-negative integers smaller than the number of repeated transmission times of the legacy preamble.

In this regard, the operation of the eNB described above may be specifically implemented by eNB devices 1610 and 1710 illustrated in FIGS. 16 and 17 of this specification. For example, the operation of the eNB described above may be performed by the processors 1611 and 1711 and/or RF units (or modules) 1613 and 1715.

Specifically, the processors 1611 and 1711 may control to receive the configuration information from the eNB in order to transmit the enhanced preamble through the RF units (or modules) 1613 and 1715 and receive the downlink control information (DCI) through the configuration information.

In this case, the DCI may include resource information (e.g., a subcarrier index, etc.) for transmission of the enhanced preamble by the UE.

Thereafter, the processors 1611 and 1711 may control to receive from the UE the random access preamble (enhanced NPRACH or enhanced preamble) according to the specific preamble structure in subcarriers allocated to the UE through the RF units (or modules) 1613 and 1715.

In this case, the specific preamble structure may have the structures described in Embodiments 1 and 2 and may be configured similar to preamble format 2.

For example, the specific preamble structure may be constituted by one CP and three symbols and a subcarrier gap may be set to 1.25 kHz.

Thereafter, the processors 1611 and 1711 may control to transmit to the UE the random access response message in response to the random access preamble through the RF units (or modules) 1613 and 1715.

The random access response message may include a TA command and support information for matching timing synchronization between the UE and the eNB as described above and the UE may perform uplink transmission after adjusting the timing by performing synchronization with the eNB based on the TA command.

The random access preamble may be repeatedly transmitted 16 times during a predetermined duration and the gap may be inserted for a predetermined time and the predetermined duration may be determined by multiplying a transmission duration in which the random access preamble is transmitted by the number of repeated transmission times.

That is, as described in Embodiment 5, in the case of the random access preamble, the number of repeated transmission times in which the gap is configured may be set to a specific (for example, 16) and the inserted gap may be set a value (e.g., 40 ms) for compatibility with the legacy UE or a value (e.g., 91.2 ms) including all gap values of the preamble formats of the legacy preamble.

In this case, the number of repeated transmission times may be set through the method described in Method 1 or 2 of Embodiment 5.

For example, the number of repeated transmission times may be set to an integer multiple of the symbol duration of the enhanced preamble and to a largest value among values of non-negative integers smaller than the number of repeated transmission times of the legacy preamble.

Overview of Devices to which Present Invention is Applicable

FIG. 16 illustrates a block diagram of a wireless communication device to which methods proposed in this specification may be applied.

Referring to FIG. 16, a wireless communication system includes an eNB 1610 and multiple user equipments 1620 positioned within an area of the eNB.

Each of the eNB and the UE may be expressed as a wireless device.

In this case, the eNB 1610 and the UE 1620 may be referred to as a first device or a second device.

The first device may be the eNB, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin-tec device (or financial device), a security device, a climate/environmental device, devices related to 5G services, or other devices related to fourth industrial revolution fields.

The second device may be the eNB, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin-tec device (or financial device), a security device, a climate/environmental device, devices related to 5G services, or other devices related to fourth industrial revolution fields.

For example, the UE may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tec device may be a device capable of providing financial services such as mobile payment. For example, the pin-tec device may include a payment device or a point of sales (POS). For example, the climate/environmental device may include a device for monitoring or predicting a climate/environment.

The eNB 1610 includes a processor 1611, a memory 1612, and a radio frequency (RF) module 1613. The processor 1611 implements a function, a process, and/or a method which are proposed in FIGS. 1 to 15 and Embodiments 1 to 5 above. Layers of a radio interface protocol may be implemented by the processor. The memory is connected with the processor to store various information for driving the processor. The RF module is connected with the processor to transmit and/or receive a radio signal.

The UE includes a processor 1621, a memory 1622, and an RF module 1623.

The processor implements a function, a process, and/or a method which are proposed in FIGS. 1 to 15 and Embodiments 1 to 5 above. Layers of a radio interface protocol may be implemented by the processor. The memory is connected with the processor to store various information for driving the processor. The RF module 1623 is connected with the processor to transmit and/or receive a radio signal.

The memories 1612 and 1622 may be positioned inside or outside the processors 1611 and 1621 and connected with the processor by various well-known means.

Further, the eNB and/or the UE may have a single antenna or multiple antennas.

FIG. 17 illustrates another example of the block diagram of the wireless communication device to which the methods proposed in this specification may be applied.

Referring to FIG. 17, a wireless communication system includes a base station 1710 and multiple user equipments 1720 positioned within an area of the base station. The eNB may be represented by a transmitting apparatus and the UE may be represented by a receiving apparatus, or vice versa. The eNB and the UE include processors 1711.1721 and 1714.1724, memories 1715.1725 and 1712.1722, one or more Tx/Rx radio frequency (RF) modules 1713.1723 and 1716.1726, Tx processors 2112 and 2122, Rx processors 2113 and 2123, and antennas 2116 and 2126. The processor implements a function, a process, and/or a method which are described above. More specifically, a higher layer packet from a core network is provided to the processor 1711 in DL (communication from the eNB to the UE). The processor implements a function of an L2 layer. In the DL, the processor provides multiplexing between a logical channel and a transmission channel and allocation of radio resources to the UE 1720, and takes charge of signaling to the UE. The transmit (TX) processor 1712 implement various signal processing functions for an L1 layer (i.e., physical layer). The signal processing functions facilitate forward error correction (FEC) at the UE and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 1716 via individual Tx/Rx modules (or transceivers, 1715). Each Tx/Rx module may modulate an RF carrier into each spatial stream for transmission. In the UE, each Tx/Rx module (or transceiver, 1726) receives a signal through each antenna 1726 of each Tx/Rx module. Each Tx/Rx module reconstructs information modulated with the RF carrier and provides the reconstructed information to the receive (RX) processor 1723.

The RX processor implements various signal processing functions of layer 1. The RX processor may perform spatial processing on information in order to reconstruct an arbitrary spatial stream which is directed for the UE. When multiple spatial streams are directed to the UE, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the base station. The soft decisions may be based on channel estimation values. The soft decisions are decoded and deinterleaved to reconstruct data and control signals originally transmitted by the eNB on the physical channel. The corresponding data and control signals are provided to the processor 1721.

UL (communication from the UE to the base station) is processed by the eNB 1710 in a scheme similar to a scheme described in association with a receiver function in the UE 1720. Each Tx/Rx module 1725 receives the signal through each antenna 1726. Each Tx/Rx module provides the RF carrier and information to the RX processor 1723. The processor 1721 may be associated with the memory 1724 storing a program code and data. The memory may be referred to as a computer readable medium.

In this specification, a wireless device may be the eNB, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, an MTC device, an IoT device, a medical device, a pin-tec device (or financial device), a security device, a climate/environmental device, or other devices related to fourth industrial revolution fields or 5G services. For example, the UAV may be a flying object that is not ridden by people but that flies by radio control signals. For example, the MTC device and the IoT device as devices that do not require direct human intervention or manipulation may include a smart meter, a vending machine, a thermometer, a smart bulb, a door lock, or various sensors. For example, the medical device as a device used for the purpose of diagnosis, treatment, alleviation, therapy, or prevention of a disease or a device used for the purpose of inspecting, replacing, or modifying a structure or function may include a treatment equipment, a surgical device, an (in vitro) diagnostic device, a hearing aid, a procedure device, etc. For example, the security device as a device installed to prevent a risk that may occur and to maintain safety may include a camera, a CCTV, a black box, etc. For example, the pin-tec device as a device capable of providing financial services such as mobile payment may include a payment device, a point of sales (POS), etc. For example, the climate/environmental device may mean a device for monitoring or predicting a climate/environment.

In this specification, the UE may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD as a head-worn type display device may be used to implement the VR or AR.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

What is claimed is:

1. A method for transmitting a random access preamble by a user equipment (UE) in a wireless communication system supporting a narrow band-Internet of things (NB-IoT), the method comprising:

transmitting, to a base station, a random access preamble according to a specific preamble structure in a subcarrier allocated by the base station; and receiving, from the base station, a random access response message in response to the random access preamble, wherein a gap is inserted for a predetermined time after the random access preamble is repeatedly transmitted 16 times during a predetermined duration, and wherein the predetermined duration is determined by multiplying a transmission duration transmitted by the random access preamble by the number of repeated transmission times of the random access preamble.

2. The method of claim 1, wherein the transmission duration is constituted by a symbol group of a Cyclic Prefix (CP) and three symbols according to the specific preamble structure.

3. The method of claim 2, wherein a subcarrier of the symbol group is hopped on a frequency axis in a specific pattern constituted by a hopping pair symmetric according to the specific preamble structure.

4. The method of claim 3, wherein subcarrier indexes of second and third symbol groups are values larger than a subcarrier index of a previous symbol group by '1' or smaller than the subcarrier index by '1' based on a start symbol group of the specific pattern,
wherein subcarrier indexes of the third symbol group and a fourth symbol group are values larger than the subcarrier index by '3' or smaller than the subcarrier index '3', and
wherein a subcarrier index of a fifth symbol group is a value larger than the subcarrier index of the previous symbol group by '18'.

5. The method of claim 1, wherein a subcarrier spacing is 1.25 kHz in the specific preamble structure.

6. The method of claim 1, wherein the gap is '40' ms.

7. The method of claim 1, wherein the random access response message includes a timing advance command value for adjusting uplink transmission timing of the UE.

8. The method of claim 7, further comprising:
performing uplink transmission based on the timing advance command value.

9. A method for receiving a random access preamble by a base station in a wireless communication system supporting a narrow band-Internet of things (NB-IoT), the method comprising:
receiving, from a UE, a random access preamble according to a specific preamble structure in an allocated subcarrier; and
transmitting, to the UE, a random access response message in response to the random access preamble,
wherein a gap is inserted for a predetermined time after the random access preamble is repeatedly transmitted 16 times during a predetermined duration, and
wherein the predetermined duration is determined by multiplying a transmission duration transmitted by the random access preamble by the number of repeated transmission times of the random access preamble.

10. A UE transmitting a random access preamble in a wireless communication system supporting a narrow band-Internet of things (NB-IoT), the UE comprising:
a radio frequency (RF) module for transmitting and receiving a radio signal; and
a processor functionally connected with the RF module, wherein the processor is configured to
transmit, to a base station, a random access preamble according to a specific preamble structure in a subcarrier allocated by the base station, and
receive, from the base station, a random access response message in response to the random access preamble, and
wherein a gap is inserted for a predetermined time after the random access preamble is repeatedly transmitted 16 times during a predetermined duration, and
wherein the predetermined duration is determined by multiplying a transmission duration transmitted by the random access preamble by the number of repeated transmission times of the random access preamble.

11. The UE of claim 10, wherein the transmission duration is constituted by a symbol group of a Cyclic Prefix (CP) and three symbols according to the specific preamble structure.

12. The UE of claim 11, wherein a subcarrier of the symbol group is hopped on a frequency axis in a specific pattern constituted by a hopping pair symmetric according to the specific preamble structure.

13. The UE of claim 12, wherein subcarrier indexes of second and third symbol groups are values larger than a subcarrier index of a previous symbol group by '1' or smaller than the subcarrier index by '1' based on a start symbol group of the specific pattern,
wherein subcarrier indexes of the third symbol group and a fourth symbol group are values larger than the subcarrier index by '3' or smaller than the subcarrier index '3', and
wherein a subcarrier index of a fifth symbol group is a value larger than the subcarrier index of the previous symbol group by '18'.

14. The UE of claim 10, wherein a subcarrier spacing is 1.25 kHz in the specific preamble structure.

15. The UE of claim 10, wherein the gap is '40' ms.

16. The UE of claim 10, wherein the random access response message includes a timing advance command value for adjusting uplink transmission timing of the UE.

17. The UE of claim 16, wherein the processor performs uplink transmission based on the timing advance command value.

* * * * *